US006970938B2

(12) United States Patent
Sugiyama et al.

(10) Patent No.: US 6,970,938 B2
(45) Date of Patent: Nov. 29, 2005

(54) SIGNAL PROCESSOR

(75) Inventors: Akira Sugiyama, Kanagawa (JP); Haruo Togashi, Kanagawa (JP); Shin Todo, Kanagawa (JP); Hideyuki Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 722 days.

(21) Appl. No.: 10/032,917

(22) Filed: Dec. 27, 2001

(65) Prior Publication Data

US 2002/0093595 A1  Jul. 18, 2002

(30) Foreign Application Priority Data

Dec. 28, 2000  (JP)  .............................. 2000-401710

(51) Int. Cl.[7] .......................................... G06F 15/16
(52) U.S. Cl. ...................... 709/231; 709/234; 709/236
(58) Field of Search ............................... 709/231, 234, 709/236, 237; 382/248

(56) References Cited

U.S. PATENT DOCUMENTS 5,664,028 A * 9/1997 Blonstein et al. ........... 382/248
5,774,593 A * 6/1998 Zick et al. .................. 382/236
6,282,322 B1 * 8/2001 Rackett ....................... 382/248
6,320,710 B1 * 11/2001 Ohnishi ....................... 360/22

FOREIGN PATENT DOCUMENTS

GB         2 341 509         3/2000

* cited by examiner

Primary Examiner—Gertrude A. Jeanglaude
(74) Attorney, Agent, or Firm—Frommer Lawrence & Haug LLP; William S. Frommer

(57) ABSTRACT

A detection circuit detects a slice start code from an input stream. Based on a result of the detection and a frame pulse, a reference macroblock (MB) address generated by a timing generator is sent to an address comparator. The input stream which has been phase-adjusted by a delay circuit is supplied to a variable length decoder (VLD) for decoding a variable length code to detect an MB address. The address comparator compares the reference MB address with the MB address to check the continuity of the MB address. If it is discontinuous, the stream output from the VLD is temporarily interrupted, and a selector selects a replacement data generating circuit in response to a control signal output from the address comparator. The input stream is replaced at a discontinuous macroblock portion with macroblock data which has a correct macroblock address and which is prepared in advance by the replacement data generating circuit. This provides stable processing of macroblock discontinuities when I-pictures in an MPEG stream are input.

16 Claims, 31 Drawing Sheets

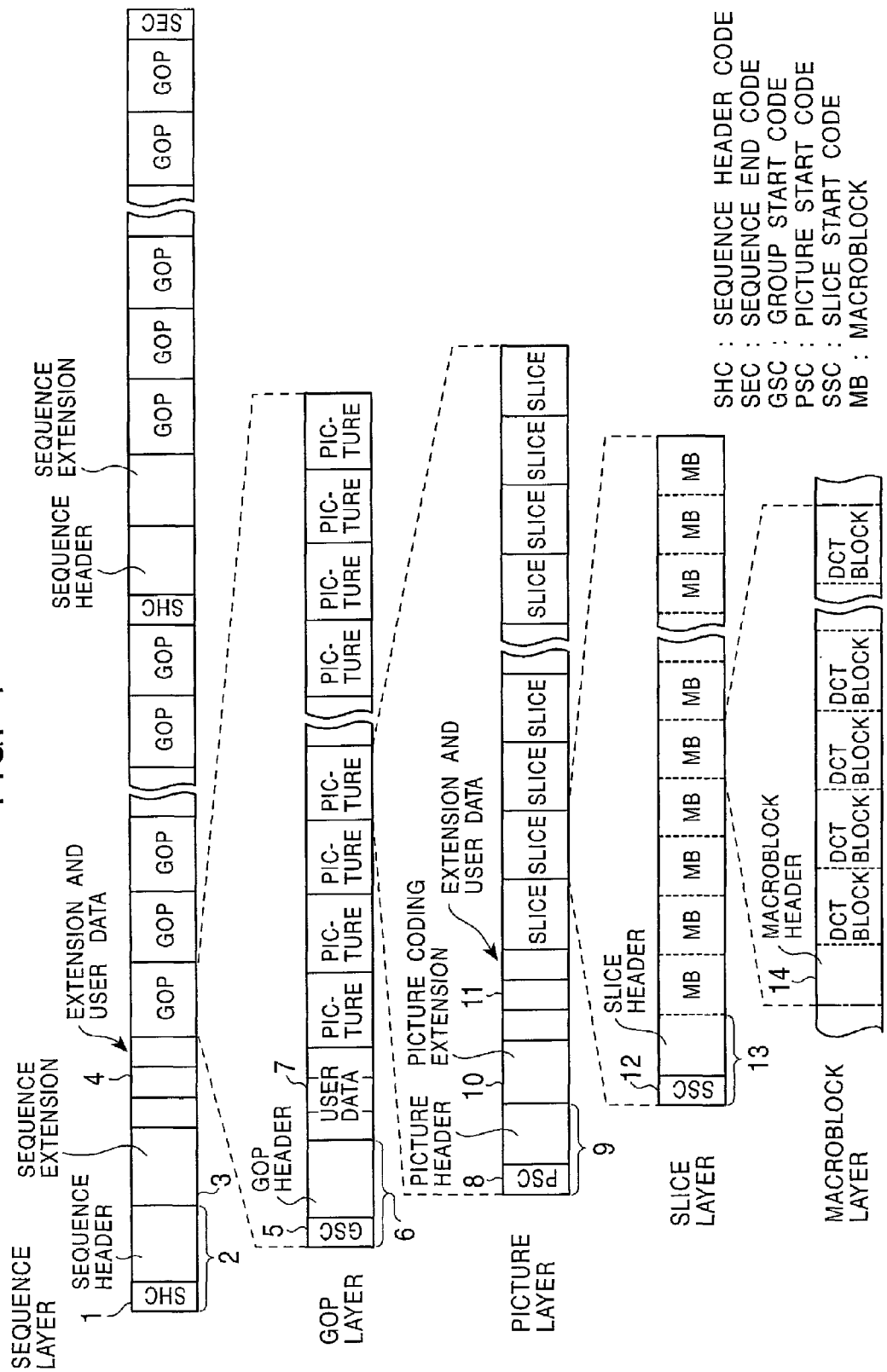

FIG. 2

| CODE | NUMBER OF BITS | DESCRIPTION |
|---|---|---|
| sequence header code | 32 | SEQUENCE HEADER CODE |
| horizontal size value | 12 | LOWER 12 BITS OF THE NUMBER OF HORIZONTAL PIXELS |
| vertical size value | 12 | LOWER 12 BITS OF THE NUMBER OF VERTICAL LINES |
| aspect ratio information | 4 | PIXEL ASPECT RATIO INFORMATION |
| frame rate code | 4 | FRAME RATE CODE |
| bit rate value | 18 | LOWER 18 BITS OF BIT RATE (FOR UNITS OF 400 BITS) |
| vbv buffer size value | 10 | LOWER 10 BITS OF VBV BUFFER SIZE |
| intra quantiser matrix [64] | 8*64 | INTRA MB QUANTIZER MATRIX VALUE |
| non intra quantiser matrix [64] | 8*64 | NON-INTRA MB QUANTIZER MATRIX VALUE |

FIG. 3

| CODE | NUMBER OF BITS | DESCRIPTION |
|---|---|---|
| extension start code | 32 | START SYNCHRONIZATION CODE OF EXTENSION DATA |
| extension start code identifier | 4 | INDICATES WHICH EXTENSION DATA IS TRANSMITTED |
| profile and level indication | 8 | INDICATION OF PROFILE AND LEVEL |
| progressive sequence | 1 | INDICATES PROGRESSIVE SCAN |
| chroma format | 2 | CHROMA FORMAT SETTING |
| horizontal size extension | 2 | UPPER 2 BITS OF THE NUMBER OF HORIZONTAL PIXELS OF PICTURE |
| vertical size extension | 2 | UPPER 2 BITS OF THE NUMBER OF VERTICAL LINES OF PICTURE |
| bit rate extension | 12 | UPPER 12 BITS OF BIT RATE VALUE |
| marker bit | 1 | PREVENTS START CODE EMULATION |
| vbv buffer size extension | 8 | UPPER 8 BITS OF VBV BUFFER SIZE |
| low delay | 1 | INDICATING THAT B-PICTURE IS NOT INCLUDED |
| frame rate extension n | 2 | FRAME RATE EXTENSION |
| frame rate extension d | 5 | FRAME RATE EXTENSION |
| next start code () | | |

FIG. 4

| CODE | NUMBER OF BITS | DESCRIPTION |
|---|---|---|
| extension data (0) | | EXTENSION DATA (0) |
| sequence display extension ( ) | | SEQUENCE DISPLAY ( ) |
| sequence scalable extension ( ) | | SEQUENCE SCALABLE EXTENSION ( ) |
| extension start code identifier | 4 | SEQUENCE SCALABLE EXTENSION ID |
| scalable mode | 2 | SCALABILITY MODE |
| layer id | 4 | LAYER ID OF SCALABLE LAYER |
| FOR SPATIAL SCALABILITY | | |
| lower layer prediction horizontal size | 14 | HORIZONTAL SIZE OF LOWER LAYER PREDICTION |
| lower layer prediction vertical size | 14 | VERTICAL SIZE OF LOWER LAYER PREDICTION |
| vertical subsampling factor n | 5 | VERTICAL UPSAMPLING FACOR |
| FOR TEMPORAL SCALABILITY | | |
| picture mux order | 3 | THE NUMBER OF ADDED LAYER PICTURES BEFORE FIRST BASE LAYER PICTURE |
| picture mux factor | 3 | THE NUMBER OF ADDED LAYER PICTURES BETWEEN BASE LAYERS |
| user data ( ) | | USER DATA ( ) |
| user data | 8 | USER DATA |

FIG. 5

| CODE | NUMBER OF BITS | DESCRIPTION |
|---|---|---|
| group start code | 32 | GOP START CODE |
| time code | 25 | TIME CODE (HOUR, MINUTE, SECOND, PICTURE) |
| closed gop | 1 | FLAG INDICATING INDEPENDENCY OF GOP |
| broken link | 1 | VALIDITY FLAG OF B-PICTURE BEFORE I-PICTURE IN GOP |

FIG. 6

| CODE | NUMBER OF BITS | DESCRIPTION |
|---|---|---|
| extension data (1) | | EXTENSION DATA (1) |
| user data ( ) | | USER DATA ( ) |
| user data | 8 | USER DATA |

FIG. 7

| CODE | NUMBER OF BITS | DESCRIPTION |
|---|---|---|
| picture start code | 32 | PICTURE START CODE |
| temporal reference | 10 | DISPLAY ORDER OF PICTURES IN GOP (modulo 1024) |
| picture coding type | 3 | PICTURE-CODING TYPE (I, B, P) |
| vbv delay | 16 | AMOUNT OF VBV DELAY UNTIL DECODING STARTS |

FIG. 8

| CODE | NUMBER OF BITS | DESCRIPTION |
|---|---|---|
| f code [s] [t] | 4 | RANGE OF MOTION VECTORS IN FORWARD AND BACKWARD DIRECTIONS (s), AND HORIZONTAL AND VERTICAL DIRECTIONS (t) |
| intra dc precision | 2 | DC COEFFICIENT PRECISION OF INTRA MB |
| picture structure | 2 | PICTURE STRUCTURE (FRAME, FIELD) |
| top field first | 1 | DISPLAY FIELD SETTING |
| frame pred frame dct | 1 | FRAME PREDICTION + FRAME DCT FLAG |
| concealment motion vectors | 1 | INTRA MB CONCEALMENT MV FLAG |
| q scale type | 1 | QUANTIZER SCALE TYPE (LINEAR, NON-LINEAR) |
| intra vlc format | 1 | INTRA MB VLC TYPE |
| alternate scan | 1 | SCANNING TYPE (ZIGZAG, ALTERNATE) |
| repeat first field | 1 | 2:3 PULL-DOWN FIELD REPEAT |
| chroma 420 type | 1 | SAME VALUE AS progressive frame IN 4:2:0 |
| progressive frame | 1 | PROGRESSIVE FRAME FLAG |

FIG. 9

| CODE | NUMBER OF BITS | DESCRIPTION |
|---|---|---|
| extension data (2) | | EXTENSION DATA (2) |
| quant matrix extension ( ) | | QUANTIZER MATRIX EXTENSION ( ) |
| intra quantiser matrix [64] | 8*64 | INTRA MB QUANTIZER MATRIX |
| non intra quantiser matrix [64] | 8*64 | NON-INTRA MB QUANTIZER MATRIX |
| chroma intra quantiser matrix [64] | 8*64 | CHROMA INTRA QUANTIZER MATRIX |
| chroma non intra quantiser matrix [64] | 8*64 | CHROMA NON-INTRA QUANTIZER MATRIX |
| copyright extension ( ) | | COPYRIGHT EXTENSION ( ) |
| picture display extension ( ) | | PICTURE DISPLAY EXTENSION ( ) |
| picture spatial scalable extension ( ) | | PICTURE SPATIAL SCALABLE EXTENSION ( ) |
| spatial temporal weight code table index | 2 | UPSAMPLING SPATIAL TEMPORAL WEIGHT CODE TABLE |
| lower layer progressive frame | 1 | LOWER LAYER PROGRESSIVE IMAGE FLAG |
| lower layer deinterlaced field select | 1 | LOWER LAYER FIELD SELECTION |
| picture temporal scable extension ( ) | | PICTURE TEMPORAL SCALABLE EXTENSION ( ) |
| reference select code | 2 | SELECTION OF REFERENCE IMAGE |
| forward temporal reference | 10 | PICTURE NUMBER OF FORWARD PREDICTIVE LOWER LAYER |
| backward temporal reference | 10 | PICTURE NUMBER OF BACKWARD PREDICTIVE LOWER LAYER |
| user data ( ) | | USER DATA ( ) |
| user data ( ) | 8 | USER DATA |

FIG. 10

| CODE | NUMBER OF BITS | DESCRIPTION |
|---|---|---|
| slice start code | 32 | SLICE START CODE + SLICE VERTICAL POSITION |
| slice vertical position extension | 3 | SLICE VERTICAL POSITION EXTENSION (>2800 LINES) |
| priority breakpoint | 7 | DATA PARTITIONING BREAKPOINT |
| quantiser scale code | 5 | QUANTIZER SCALE CODES (1 to 31) |
| intra slice | 1 | INTRA SLICE FLAG |
| macroblock ( ) | | MACROBLOCK DATA ( ) |

FIG. 11

| CODE | NUMBER OF BITS | DESCRIPTION |
|---|---|---|
| macroblock escape | 11 | MB ADDRESS EXTENSION (>33) |
| macroblock address increment | 1 - 11 | DIFFERRENCE BETWEEN CURRENT MB ADDRESS AND PREVIOUS MB ADDRESS |
| macroblock modes ( ) | | MACROBLOCK MODE ( ) |
| macroblock type | 1 - 9 | MB CODING TYPE (MC, Coded, etc.) |
| spatial temporal weight code | 2 | UPSAMPLING SPATIAL TEMPORAL WEIGHT CODE |
| frame motion type | 2 | MOTION COMPENSATION TYPE FOR FRAME STRUCTURE |
| field motion type | 2 | MOTION COMPENSATION TYPE FOR FIELD STRUCTURE |
| dct type | 1 | DCT TYPE (FRAME, FIELD) |
| quantiser scale code | 5 | MB QUANTIZER SCALE CODES (1 to 31) |
| motion vectors (s) | | MOTION VECTORS (s) |
| motion vertical field select [r] [s] | 1 | SELECTION OF REFERENCE FIELD FOR PREDICTION |
| motion vector (r, s) | | MOTION VECTOR (r, s) |
| motion code [r] [s] [t] | 1 - 11 | FUNDAMENTAL DIFFERENTIAL MOTION VECTOR |
| motion residual [r] [s] [t] | 1 - 8 | RESIDUAL DIFFERENTIAL VECTOR |
| dmvector [t] | 1 - 2 | DUAL PRIMING DIFFERENTIAL VECTOR |
| coded block pattern ( ) | | CBP |
| block (l) | | BLOCK DATA ( ) |

FIG. 12

| CODE | NUMBER OF BITS | DESCRIPTION |
|---|---|---|
| dct dc size luminance | 2 - 9 | DCT LUMINANCE DC COEFFICIENT DIFFERENTIAL SIZE |
| dct dc differential | 1 - 11 | DCT LUMINANCE DC COEFFICIENT DIFFERENTIAL VALUE |
| dct dc size chrominance | 2 - 10 | DCT CHROMINANCE DC COEFFICIENT DIFFERENTIAL SIZE |
| dct dc differential | 1 - 11 | DCT CHROMINANCE DC COEFFICIENT DIFFERENTIAL VALUE |
| First DCT coefficient | 3 - 24 | FIRST NON-ZERO COEFFICIENT OF NON-INTRA BLOCK |
| Subsequent DCT coefficient | 2 - 24 | SUBSEQUENT DCT COEFFICIENT |
| End of block | 2 or 4 | FLAG INDICATING END OF DCT COEFFICIENT IN BLOCK |

× LUMINANCE SIGNAL (Y)
⊘ CHROMINANCE SIGNAL (Cr)
○ CHROMINANCE SIGNAL (Cb)

× LUMINANCE SIGNAL (Y)
⊗ CHROMINANCE SIGNAL (Cr)
○ CHROMINANCE SIGNAL (Cb)

× LUMINANCE SIGNAL (Y)
◐ CHROMINANCE SIGNAL (Cr)
◑ CHROMINANCE SIGNAL (Cb)

| (0,0) | (0,1) | (0,2) | (0,3) | (0,4) | | (0,40) | (0,41) | (0,42) | (0,43) | (0,44) |
|---|---|---|---|---|---|---|---|---|---|---|
| (1,0) | (1,1) | (1,2) | (1,3) | (1,4) | | (1,40) | (1,41) | (1,42) | (1,43) | (1,44) |
| (2,0) | (2,1) | (2,2) | (2,3) | (2,4) | ... | (2,40) | (2,41) | (2,42) | (2,43) | (2,44) |
| (3,0) | (3,1) | (3,2) | (3,3) | (3,4) | | (3,40) | (3,41) | (3,42) | (3,43) | (3,44) |
| (4,0) | (4,1) | (4,2) | (4,3) | (4,4) | | (4,40) | (4,41) | (4,42) | (4,43) | (4,44) |
| ⋮ | | | | | | ⋮ | | | | |
| (36,0) | (36,1) | (36,2) | (36,3) | (36,4) | ... | (36,40) | (36,41) | (36,42) | (36,43) | (36,44) |
| (37,0) | (37,1) | (37,2) | (37,3) | (37,4) | | (37,40) | (37,41) | (37,42) | (37,43) | (37,44) |

MACROBLOCK MISSING

WAIT

FIG. 28

| ITEM | VALUE | CONTENT |
|---|---|---|
| slice_start_code | 32'h00_00_01_03 | (03 IS CREATED FROM mb_row ON SCREEN) |
| quantizer_scale_code | 5'b1 0000 | |
| extra_bit_slice | 1'b0 | |
| macroblock_escape | 11'b0000_0001_000 | (CREATED FROM mb_column ON SCREEN) |
| macroblock_address_increment | 8'b0000_1010 | (CREATED FROM mb_column ON SCREEN) |
| macroblock_type | 1'b1 | |
| dct_type | 1'b1 | |
| dct_dc_size_luminance | 3'b100 | Y1 DC |
| eob | 4'b0110 | |
| dct_dc_size_luminance | 3'b100 | Y2 DC |
| eob | 4'b0110 | |
| dct_dc_size_luminance | 3'b100 | Y3 DC |
| eob | 4'b0110 | |
| dct_dc_size_luminance | 3'b100 | Y4 DC |
| eob | 4'b0110 | |
| dct_dc_size_chrominance | 2'b00 | Cb1 DC |
| eob | 4'b0110 | |
| dct_dc_size_chrominance | 2'b00 | Cr1 DC |
| eob | 4'b0110 | |
| dct_dc_size_chrominance | 2'b00 | Cb2 DC |
| eob | 4'b0110 | |
| ct_dc_size_chrominance | 2'b00 | Cr2 DC |
| eob | 4'b0110 | |

| (0,0) | (0,1) | (0,2) | (0,3) | (0,4) | | (0,40) | (0,41) | (0,42) | (0,43) | (0,44) |
|---|---|---|---|---|---|---|---|---|---|---|
| (1,0) | (1,1) | (1,2) | (1,3) | (1,4) | | (1,40) | (1,41) | (1,42) | (1,43) | (1,44) |
| (2,0) | (2,1) | (2,2) | (2,3) | (2,4) | ... | (2,40) | (2,41) | (2,42) | (2,43) | (2,44) |
| (3,0) | (3,1) | (3,2) | (3,3) | (3,4) | | (3,40) | (3,41) | (3,42) | (3,43) | (3,44) |
| (4,0) | (4,1) | (4,2) | (4,3) | (4,4) | | (4,40) | (4,41) | (4,42) | (4,43) | (4,44) |
| ⋮ | | | | | | ⋮ | | | | |
| (36,0) | (36,1) | (36,2) | (36,3) | (36,4) | ... | (36,40) | (36,41) | (36,42) | (36,43) | (36,44) |
| (37,0) | (37,1) | (37,2) | (37,3) | (37,4) | | (37,40) | (37,41) | (37,42) | (37,43) | (37,44) |

MB ADDRESS DELAYED next_macroblock_address

RELATED ART

FIG. 32A

| (0,0) | (0,1) | (0,2) | (0,3) | (0,4) | | (0,40) | (0,41) | (0,42) | (0,43) | (0,44) |
|---|---|---|---|---|---|---|---|---|---|---|
| (1,0) | (1,1) | (1,2) | (1,3) | (1,4) | | (1,40) | (1,41) | (1,42) | (1,43) | (1,44) |
| (2,0) | (2,1) | (2,2) | (2,3) | (2,4) | ... | (2,40) | (2,41) | (2,42) | (2,43) | (2,44) |
| (3,0) | (3,1) | (3,2) | (3,3) | (3,4) | | (3,40) | (3,41) | (3,42) | (3,43) | (3,44) |
| (4,0) | (4,1) | (4,2) | (4,3) | (4,4) | | (4,40) | (4,41) | (4,42) | (4,43) | (4,44) |
| ⋮ | | | | | | ⋮ | | | | |
| (36,0) | (36,1) | (36,2) | (36,3) | (36,4) | ... | (36,40) | (36,41) | (36,42) | (36,43) | (36,44) |
| (37,0) | (37,1) | (37,2) | (37,3) | (37,4) | | (37,40) | (37,41) | (37,42) | (37,43) | (37,44) |

↑
MACROBLOCK
MISSING

SIGNAL PROCESSOR

BACKGROUND OF THE INVENTION

1. Field of the Invention

The present invention relates to a signal processor capable of providing stable processing, for each macroblock, of video data compressed by variable-length coding.

2. Description of the Related Art

In recent years, so-called MPEG (Moving Picture Experts Group) encoding has been widely used as a compression algorithm for digital video signals. MPEG-2 is a motion picture compression standard using the DCT (Discrete Cosine Transform) and predictive coding. MPEG-2 encoding involves: breaking picture data of one frame into macroblocks having a predetermined size, each macroblock being predictive coded using a motion vector; and further breaking each macroblock into DCT blocks, each DCT block being subjected to the DCT for variable-length coding. MPEG-2 which was developed to provide higher extensibility and higher picture quality is the dominant standard in the state of the art.

Generally, MPEG-2 data is formed of a data stream having a hierarchical structure. The hierarchical structure is composed of a sequence layer, a GOP (Group Of Pictures) layer, a picture layer, a slice layer, and a macroblock layer in the stated order from the top, each layer containing one or more sublayers. Each layer contains a header section. The layers except for the macroblock layer have start codes arranged before the header sections.

The macroblock is a block having 16×16 pixels, and one or more macroblocks form one slice. One picture corresponds to one screen, and a slice is not permitted to extend over pictures. It is required that a slice header always reside at the left end of the screen. The slice start code contains vertical position information of the slice in question, and the slice header stores information such as extended slice vertical position information or quantizer scale information.

In MPEG-2, three picture types are defined. B (bi-directionally) pictures and P (predictive) pictures are predictive-coded in a time series manner, and I (intra) pictures are completed within one screen (one frame). P-picture requires the temporally earlier picture, and B-picture requires the temporally earlier and later pictures. It is preferable to use only I-pictures in order to achieve editing for each frame.

FIGS. 32A to 32C illustrate exemplary macroblock addresses according to the 625/50 standard. FIG. 32A shows an exemplary array of macroblocks on a screen. One screen is broken into 38 rows×45 columns of macroblocks. Coordinates (yy,xx) in the blocks shown in FIG. 32A represent addresses of the macroblocks, in which the location of the blocks on the screen is defined as coordinates (vertical position, horizontal position). In the above-described MPEG stream which is formed of I-pictures, the macroblocks must be orderly and fully transmitted.

More specifically, if macroblocks are arranged on one screen in the manner shown in FIG. 32A, in the data stream in which I-pictures are transmitted, it is expected that, for example, shaded macroblocks shown in FIG. 32A are transmitted in the order of (2,41), (2,42), (2,43), (2,44), (3,0), (3,1), (3,2), and (3,3), as shown in FIG. 32B, by way of example.

If a portion of the macroblocks, for example, (2,43), is missing during transmission etc. for some reason, the data stream in which macroblock (2,42) is followed by macroblock (2,44), as shown in FIG. 32C, is irregular in which the macroblock addresses are discontinuous. Such an irregular stream introduces MPEG syntax errors which do not conform to the MPEG standard.

A portion of macroblocks is missing possibly because failure occurs in the transmission path, namely, bit inversion occurs or the data stream is interrupted on the transmission path etc. An irregular data stream originally containing a discontinuous macroblock address may also result in missing a macroblock.

Once such an irregular data stream is input to an MPEG decoder, the MPEG decoder may entail a risk of hang-up because an unpredictable macroblock address has been input. Conventionally, it is thus difficult to achieve a stable system.

SUMMARY OF THE INVENTION

Accordingly, it is an object of the present invention to provide a data processor capable of stable processing of a discontinuous macroblock when I-pictures in an MPEG stream or the like are input.

To this end, in one aspect of the present invention, a data processor for processing a data stream in which a plurality of blocks into which a screen is divided are arranged in a predetermined order includes: a detection unit for detecting block discontinuities based on position information of the blocks on the screen, the position information being stored in each of the blocks arranged in the data stream; and a correction unit for correcting the block discontinuities based on a result of the detection by the detection unit.

The data stream is preferably a variable-length coded data stream, and block discontinuities are detected by the detection unit when the variable-length coded data stream is decoded.

The correction unit may correct block discontinuities using a block having the position information that satisfies the continuous order.

If it is determined from a result of the detection by the detection unit that a portion of the blocks is missing, the correction unit may correct block discontinuities by temporarily interrupting the data stream for the period of the missing block portion.

If it is determined from a result of the detection by the detection unit that one block and another of the blocks are exchanged, the correction unit may find position information of the block subsequent to an exchanged block, and, based on the position information, may repeatedly correct block discontinuities until a block having correct position information is found.

The data processor may further include a frame memory capable of storing at least one frame of data. At least one frame of data in the data stream is preferably stored in the frame memory. If it is determined from a result of the detection by the detection unit that the position information of the blocks is discontinuous, the correction unit may correct the position information discontinuities of the blocks using the data stored in the frame memory.

If it is determined from a result of the detection by the detection unit that a portion of the blocks is missing, the correction unit may correct block discontinuities using the data of the block one frame before which corresponds to the missing block portion, the data being stored in the frame memory.

If it is determined from a result of the detection by the detection unit that one block and another of the blocks are exchanged, the correction unit may correctly reorder the blocks by controlling addresses in the frame memory.

In another aspect of the present invention, a data processing method of processing a data stream in which a plurality of blocks into which a screen is divided are arranged in a predetermined order, includes the steps of detecting block discontinuities based on position information of the blocks on the screen, the position information being stored in each of the blocks arranged in the data stream, and correcting the block discontinuities based on a result of the detecting step.

Other objects, features, and advantages of the present invention will become apparent from the following detailed description of the invention, taken in conjunction with the accompanying drawings.

BRIEF DESCRIPTION OF THE DRAWINGS

FIG. 1 is a schematic view of the hierarchical structure of MPEG-2 data;

FIG. 2 is a simplified table showing the content and bit allocation of data contained in the MPEG-2 stream;

FIG. 3 is a simplified table showing the content and bit allocation of data contained in the MPEG-2 stream;

FIG. 4 is a simplified table showing the content and bit allocation of data contained in the MPEG-2 stream;

FIG. 5 is a simplified table showing the content and bit allocation of data contained in the MPEG-2 stream;

FIG. 6 is a simplified table showing the content and bit allocation of data contained in the MPEG-2 stream;

FIG. 7 is a simplified table showing the content and bit allocation of data contained in the MPEG-2 stream;

FIG. 8 is a simplified table showing the content and bit allocation of data contained in the MPEG-2 stream;

FIG. 9 is a simplified table showing the content and bit allocation of data contained in the MPEG-2 stream;

FIG. 10 is a simplified table showing the content and bit allocation of data contained in the MPEG-2 stream;

FIG. 11 is a simplified table showing the content and bit allocation of data contained in the MPEG-2 stream;

FIG. 12 is a simplified table showing the content and bit allocation of data contained in the MPEG-2 stream;

FIG. 28 is a table showing an example macroblock which displays gray;

FIG. 32A to 32C are schematic view which illustrate an example macroblock address according to the PAL system.

DESCRIPTION OF THE PREFERRED EMBODIMENTS

Figure 13A:
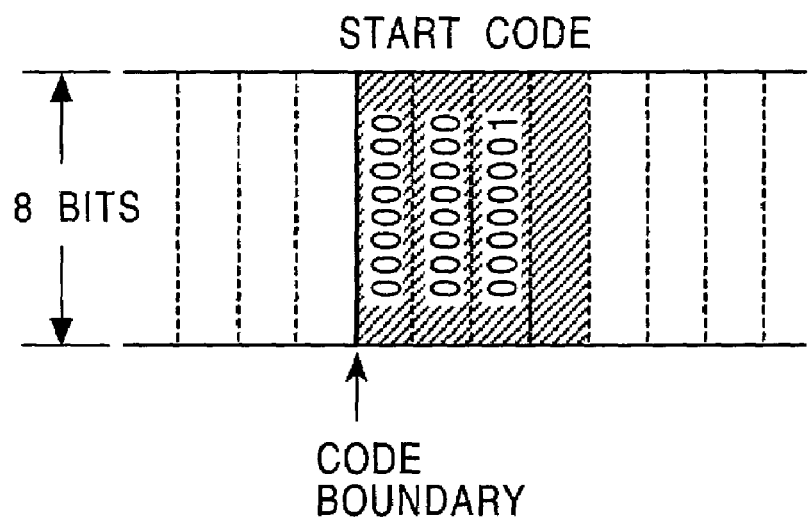
FIGS. 13A and 13B are views of an array of data in bytes.

In the following description, a digital VTR is implemented as one embodiment of the present invention. The digital VTR is suitable for use in a broadcasting environment. However, the present invention is not limited thereto.

This embodiment employs MPEG-2 as a compression algorithm, by way of example. MPEG-2 is a combination of motion-compensated predictive coding and DCT-based compression. The MPEG-2 data structure is hierarchical. FIG. 1 schematically illustrates the hierarchical structure of a typical MPEG-2 data stream. The data structure is composed of a macroblock layer, a slice layer, a picture layer, a GOP layer, and a sequence layer, in the stated order from lower layers.

As shown in FIG. 1, the macroblock layer includes DCT blocks which are units of the DCT. The macroblock layer is composed of a macroblock header and a plurality of DCT blocks. The slice layer is formed of a slice header section and one or more macroblocks. The picture layer is formed of a picture header section and one or more slices. The picture corresponds to one screen. The GOP layer is formed of a GOP header section, intra-frame coded pictures or I-pictures, and predictive-coded pictures or P- and B-pictures.

I-pictures (intra-coded pictures) are coded using information only within the current picture. I-pictures can be thus decoded using only their own information.

P-pictures (predictive-coded pictures) use the temporally earlier I- or P-pictures, which have been decoded, as a prediction picture or a differential reference picture. For each macroblock in a P-picture, a difference between the prediction picture after motion compensation and that P-picture may be encoded, or that P-picture itself may be encoded. More efficient approach is selected.

B-pictures (bi-directionally predictive-coded pictures) use three kinds of prediction pictures which are differential reference pictures, consisting of the temporally earlier I- or P-pictures, which have been decoded, the temporally later I- or P-pictures, which have been decoded, and interpolation pictures created from both. For each macroblock in a B-picture, a difference between that B-picture and either of the three kinds of predictive coding after motion compensation may be encoded, or each macroblock in a B-picture may intra-coded. The most efficient approach is selected.

Accordingly, the macroblock types include an intra-frame coded macroblock, a forward inter-frame predictive macroblock in which future frames are predicted from previous frames, a backward inter-frame predictive macroblock in which previous frames are predicted from future frames, and a bi-directional macroblock in which frames are forward and backward predicted. All of the macroblocks contained in an I-picture are intra-frame coded macroblocks. A P-picture contains intra-frame coded macroblocks and forward inter-frame predictive macroblocks. A B-picture contains the above-noted four types of macroblocks.

The GOP layer includes at least one I-picture, and may not include a P- or B-picture. The uppermost sequence layer includes a sequence header section and a plurality of GOPs, as shown in FIG. 1.

In the MPEG format, a slice is one variable length code sequence. The term "variable length code sequence" is a sequence in which the data boundary cannot be detected until variable length codes have been precisely decoded.

A start code having a predetermined bit pattern organized in bytes resides at the beginning of each of the sequence layer, the GOP layer, the picture layer, and the slice layer. The start code at the beginning of the sequence layer is called a sequence header code, and the start codes at the beginning of the other layers are called a GOP start code, a picture start code, and a slice start code, respectively. The predetermined bit pattern may be represented by [00 00 01 xx] (hereinafter bracketed expressions [ ] are in hexadecimal form), in which two digits are grouped and [xx] indicates variable values depending upon the layers.

The start codes and the sequence header code each have four-byte (=32-bit) data, in which the fourth byte value helps to identify the type of information subsequent thereto. Since the start codes and the sequence header code are organized in bytes, pattern matching for four-byte data is only required for acquisition.

The upper four bits of data in the one byte of data subsequent to the start codes corresponds to an identifier for the content of extension data regions as described later. The value of the identifier helps to identify the content of the extension data.

It is noted that the macroblock layer and DCT blocks in a macroblock do not include such an identification code having a bit pattern organized in bytes.

The header sections of the respective layers will be described in more detail.

The sequence layer includes, first, a sequence header 2, followed by a sequence extension 3 and extension and user data 4. A sequence header code 1 resides before the sequence header 2. Although not shown in FIG. 1, each of the sequence extension 3 and the extension and user data 4 also includes a start code at the beginning. The header section of the sequence layer is constituted by the sequence header 2, the sequence extension 3, and the extension and user data 4.

As shown in FIG. 2 which shows descriptions and allocation bits, the sequence header 2 contains information set for a unit of sequence, to each of which a predetermined number of bits is allocated. The stored information includes the sequence header code 1, a coded picture size consisting of the number of horizontal pixels and the number of vertical lines, an aspect ratio, a frame rate, a bit rate, a VBV (Video Buffering Verifier) buffer size, and a quantizer matrix.

In the sequence extension 3 which follows the extension start code subsequent to the sequence header 2, as shown in FIG. 3, additional data for use in MPEG-2 including a profile, a level, a chroma (chrominance) format, and a progressive sequence is set.

As shown in FIG. 4, the extension and user data 4 may contain information such as the RGB conversion characteristics of the original signal and the size of a displayed picture, as expressed by sequence display ( ), and may contain setting of scalability mode and scalable layer, as expressed by sequence scalable extension ( ).

The header section of the sequence layer is followed by GOPs. As shown in FIG. 1, a GOP header 6 and user data 7 are at the top of a GOP. The GOP header 6 and the user data 7 constitute the header section of a GOP. As shown in FIG. 5, the GOP header 6 contains a GOP start code 5, a time code, and flags indicating the independency and validity of that GOP, to which predetermined bits are respectively allocated. As shown in FIG. 6, the user data 7 contains extension data and user data. Although not shown herein, the extension data and the user data each include a start code at beginning thereof.

The header section of the GOP layer is followed by pictures. As shown in FIG. 1, a picture header 9, a picture coding extension 10, and extension and user data 11 are organized at the beginning of a picture. A picture start code 8 resides at the beginning of the picture header 9. The picture coding extension 10 and the extension and user data 11 each contain a start code at the beginning thereof. The picture header 9, the picture coding extension 10, and the extension and user data 11 constitute the header section of the picture layer.

As shown in FIG. 7, the picture header 9 contains the picture code 8, and coding conditions for the screen are set therein. In the picture coding extension 10, as shown in FIG. 8, a range of motion vectors in forward/backward and horizontal/vertical directions is designated, or the picture structure is set. Furthermore, in the picture coding extension 10, the DC coefficient precision of intra macroblocks is set, a VLC type is selected, a linear or non-linear quantizer scale is selected, a scanning method in the DCT is selected, etc.

In the extension and user data 11, as shown in FIG. 9, a quantizer matrix is set, spatial scalable parameters are set, etc. These may be set for each picture, resulting in coding according to characteristics of each screen. In the extension and user data 11, copyright information may also be set.

The header section of the picture layer is followed by slices. As shown in FIG. 1, a slice header 13 at the beginning of a slice, and a slice start code 12 resides at the beginning of the slice header 13. As shown in FIG. 10, the slice start code 12 contains vertical position information of that slice. The slice header 13 contains extended vertical position information of that slice, and quantizer scale information.

The header section of the slice layer is followed by macroblocks. A macroblock includes a macroblock header 14, followed by a plurality of DCT blocks. As described above, the macroblock header 14 does not include a start code. As shown in FIG. 11, the macroblock header 14 contains relative position information of that macroblock, and motion compensation mode setting, detailed setting of DCT coding, etc. are directed therein.

The macroblock header 14 is followed by DCT blocks. As shown in FIG. 12, a DCT block contains variable-length coded DCT coefficients, and data on the DCT coefficients.

Figure 13B:
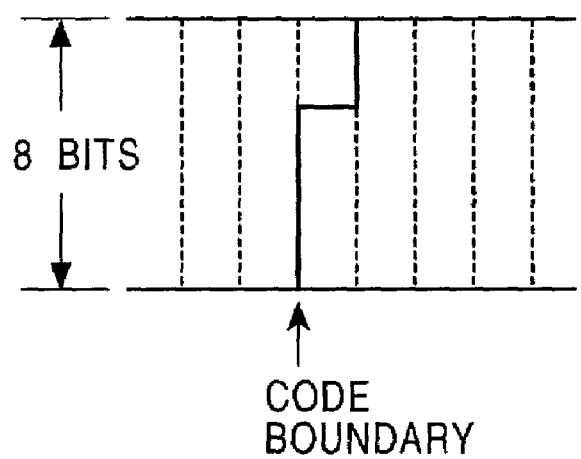

In the layers shown in FIG. 1, the data segmented by solid lines indicate that they are organized in bytes, while the data segmented by dotted lines indicate that they are not organized in bytes. That is, in each of the sequence layer, the GOP layer, and the picture layer, the codes are segmented in bytes, as in an example shown in FIG. 13A. In the slice layer, only the slice start code 12 is segmented in bytes, while the macroblocks can be segmented into bits, as in an example shown in FIG. 13B. In the macroblock layer, the DCT blocks can be segmented in bits.

In order to avoid deterioration of signals due to decoding or encoding, desirably, the coded data is edited without being modified. The P- and B-pictures must be decoded using the temporally previous picture, and the temporally previous and next pictures, respectively, and cannot be thus edited for each frame. In view of this point, in this embodiment, one GOP is composed of a single I-picture.

Since MPEG-2 employs variable-length coding, the quantity of data generated in one frame is controlled so that the data generated in one frame can be recorded in a recording area having a predetermined size. Furthermore, in this embodiment, for adaptation to recording on magnetic tapes, one slice is composed of a single macroblock, and the single macroblock is put into a fixed frame having a fixed length.

Figure 14:
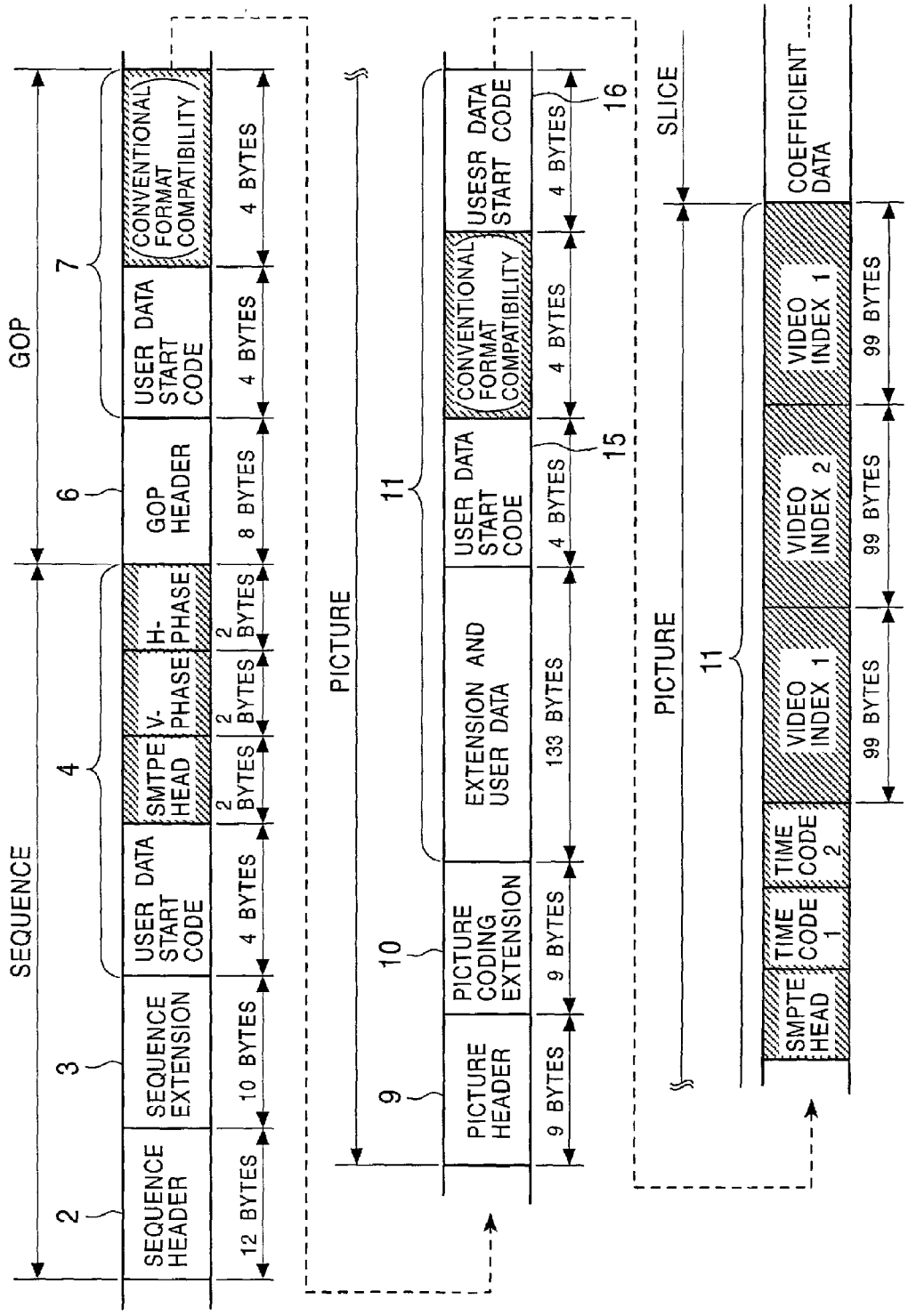
FIG. 14 is a schematic view of headers in an MPEG stream in one embodiment of the present invention.

FIG. 14 specifically shows headers of an MPEG stream according to this embodiment. As is obvious from FIG. 1, the header sections of the sequence layer, the GOP layer, the picture layer, the slice layer, and the macroblock layer successively appear from the beginning of the sequence layer. FIG. 14 shows an example successive data stream starting from the sequence header section.

The sequence header 2 having a length of 12 bytes resides at the beginning of the stream, followed by the sequence extension 3 having a length of 10 bytes. The sequence extension 3 is followed by the extension and user data 4. The user data start code of four bytes resides at the beginning of the extension and user data 4, and a user data area subsequent thereto contains information which conforms to the SMPTE (Society of Motion Picture and Television Engineers) standard.

The header section of the sequence layer is followed by the header section of the GOP layer, in which the GOP header 6 having a length of eight bytes is followed by the extension and user data 7. The user data start code of four bytes resides at the beginning of the extension and user data 7, and a user data area subsequent thereto contains information for providing compatibility with other existing video formats.

The header section of the GOP layer is followed by the header section of the picture layer, in which the picture header 9 having a length of nine bytes is followed by the picture coding extension 10 having a length of nine bytes. The extension and user data 11 resides after the picture coding extension 10. The extension and user data is stored so as to extend over 133 bytes from the beginning of the extension and user data 11, followed by the user data start code 15 having a length of four bytes. Subsequent to the user data start code 15, information for providing compatibility with other existing vide formats is stored. The user data start code 16 resides thereafter, and data complying with the SMPTE standard is stored after the user data start code 16. The header section of the picture layer is followed by slices.

A further description is given of macroblocks. A macroblock contained in the slice layer is a set of DCT blocks, and the coding of the DCT blocks involves variable-length coding of a sequence of quantized DCT coefficients using a series (run) of zero coefficients followed by a non-zero sequence (level) as one unit. No identification code organized in bytes is added to the macroblock and the DCT blocks in the macroblock.

The macroblock corresponds to a piece divided from a screen (picture) in a matrix of 16 pixels by 16 lines. For example, a slice may be a horizontal sequence of the macroblocks. In a series of slices, the last macroblock of one slice is continuous with the first macroblock of the next slice, and the macroblocks are not allowed to overlap between the slices. Once the screen size is defined, the number of macroblocks per screen is uniquely determined.

The number of macroblocks in the vertical direction and the number of macroblocks in the horizontal direction on the screen are referred to as mb_height and mb_width, respectively. As defined, the coordinates of a macroblock on the screen are expressed by mb_row in which the macroblock vertical position number starts with 0 from the top end, and mb_column in which the macroblock horizontal position number starts with 0 from the left end. In order to express macroblock positions on the screen using a single variable, macroblock_address is defined in the following way:

macroblock_address=$mb\_row \times mb\_width + mb\_column$.

It is defined that the slices and the macroblocks be each ordered in the stream according to the ascending order of macroblock_address. That is, the stream is transmitted from the top to the bottom and from the left to the right of the screen.

In MPEG, typically, one slice is formed of one stripe (16 lines), and variable-length coding starts at the left side and ends at the right side of the screen. Therefore, if a VTR is used to record an MPEG elementary stream without modification, portions capable of being played when played back at a high rate are concentrated in the left side of the screen, preventing uniform refreshing. Furthermore, since the location of data on the tape cannot be predicted, the screen cannot be uniformly refreshed if the tape pattern is traced at a constant rate. Moreover, an error which occurs at one location would influence up to the right side of the screen, resulting in no recovery until the next slice header has been detected. In order to avoid such an inconvenience, one slice is constituted by one macroblock.

Figure 15:
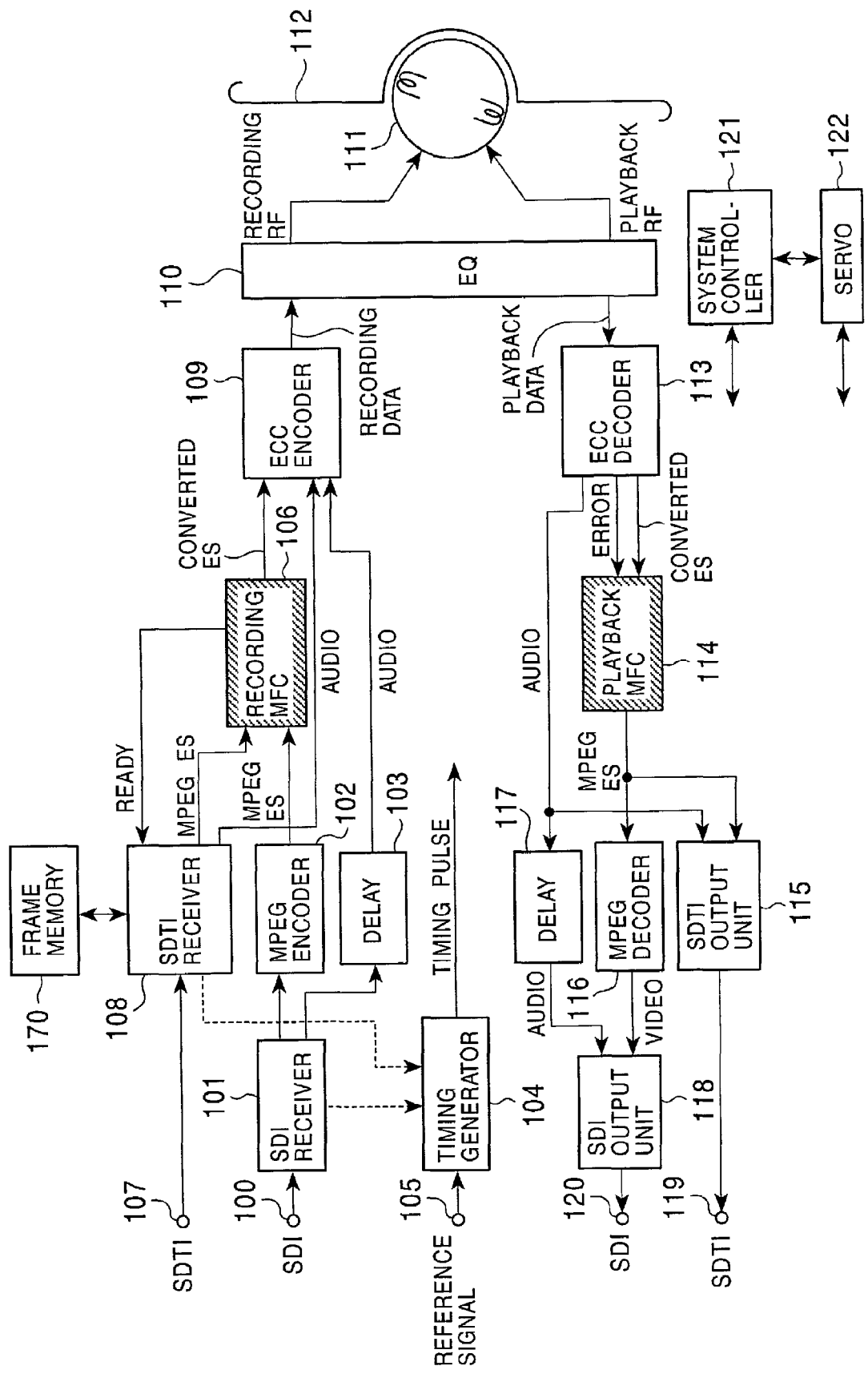
FIG. 15 is a block diagram of the structure of an example recorder/player in one embodiment of the present invention.

FIG. 15 shows the structure of an example recorder/player according to this embodiment. For recording, a digital signal input from a terminal 100 is fed to an SDI (Serial Data Interface) receiver 101. SDI is an interface which is regulated by SMPTE to transmit a (4:2:2) component video signal, a digital audio signal, and additional data. The SDI receiver 101 extracts a digital video signal and a digital audio signal from the input digital signal. The digital video signal is delivered to an MPEG encoder 102, and the digital audio signal is delivered to an ECC encoder 109 through a delay unit 103. The delay unit 103 serves to eliminate a difference in time between the digital audio signal and the digital video signal.

The SDI receiver 101 also extracts a synchronization signal from the input digital signal, and supplies the extracted synchronization signal to a timing generator 104. An external synchronization signal may also be input to the timing generator 104 from a terminal 105. The timing generator 104 generates timing pulses according to the specified signal among these input synchronization signals and a synchronization signal fed from an SDTI receiver 108 as described later. The generated timing pulses are fed to components of the recorder/player.

An input video signal is subjected to DCT processing in the MPEG encoder 102 for conversion into coefficient data, so that the coefficient data is variable-length coded. The variable-length coded (VLC) data from the MPEG encoder 102 is an elementary stream (ES) complying with MPEG-2. The resultant output is passed to a first input terminal of a recording multi-format converter (hereinafter referred to as "MFC") 106.

On the other hand, SDTI-format data is input through an input terminal 107. This signal is synchronously detected by the SDTI receiver 108. The resultant signal is buffered in a frame memory 170, and the elementary stream is then extracted. The extracted elementary stream, of which the read timing is controlled by a "ready" signal delivered from the recording MFC 106, is read from the frame memory 170, and is then fed to a second input terminal of the recording MFC 106. The resulting synchronization signal synchronously detected by the SDTI receiver 108 is passed to the timing generator 104.

In one embodiment, for example, SDTI (Serial Data Transport Interface)-CP (Content Package) is used to transmit the MPEG ES (MPEG elementary stream). This ES is a 4:2:2 component, and is a stream consisting of I-pictures, having a relationship of 1 GOP=1 picture. In the SDTI-CP format, MPEG ES is separated to access units, and is packed in packets for each frame. SDTI-CP uses a sufficient transmission bandwidth (27 MHz or 36 MHz as the clock rate, and 270 Mbps or 360 Mbps as the stream bit rate), allowing the ES to be transmitted in a burst mode in one frame.

Specifically, system data, a video stream, an audio stream, and AUX data are arranged from SAV (Start of Active Video) to EAV (End of Active Video) in one frame. The data are not entirely distributed over one frame, but are distributed in a burst mode in a predetermined period from the beginning of that frame. An SDTI-CP stream (video and audio) can be switched as a stream at frame boundaries. SDTI-CP has a mechanism which establishes audio-video synchronization for the content using an SMPTE time code as a clock reference. The formats are defined so that SDTI-CP and SDI may coexist.

The above-described interface using SDTI-CP does not require that an encoder and a decoder be passed through VBV (Video Buffer Verifier) buffers and TBs (Transport Buffers) as in the case where TS (transport stream) is transferred, thereby reducing the delay. Since SDTI-CP itself provides an extremely high transfer rate, the delay can be further reduced. Therefore, in the environment where synchronization is achieved so that the overall broadcast station can be managed, it is effective to use SDTI-CP.

The SDTI receiver 108 further extracts a digital audio signal from the input SDTI-CP stream. The extracted digital audio signal is supplied to the ECC encoder 109.

The recording MFC 106 incorporates a selector and a stream converter. The recording MFC 106 and a playback MFC 114 as described later are commonly used, for example, by switching the modes. The processing in the recording MFC 106 is described. The selector is used to select either MPEG ES supplied from the MPEG encoder 102 or from the SDTI receiver 108, which is then supplied to the stream converter.

The stream converter groups the DCT coefficients, which have been organized for each DCT block according to the MPEG-2 standard, on a frequency component basis for a plurality of DCT blocks constituting one macroblock, and groups of frequency components are further reorganized. When one slice is formed of one stripe, the stream converter makes one slice formed of one macroblock. The stream converter further limits the maximum length of the variable length data generated in one macroblock to a fixed length. This is achievable by setting high-order DCT coefficients to 0.

As described in detail later, the stream converter detects the sequence extension 3 subsequent to the sequence header 2 of the supplied MPEG ES to extract information chroma_format indicating a chroma format from the sequence extension 3. Based on the extracted chroma format information, the stream converter controls the process timing of the input MPEG ES so that the chroma formats 4:2:2 and 4:2:0 may be commonly processed.

The converted elementary stream which is reorganized by the recording MFC 106 is supplied to the ECC encoder 109. The ECC encoder 109 is connected to a main memory (not shown) having a large capacity, and includes a packing and shuffling unit, an audio outer encoder, a video outer encoder, an inner encoder, an audio shuffling unit, and a video shuffling unit. The ECC encoder 109 further includes a circuit for adding IDs to each sync block, and a circuit for adding synchronization signals. For example, the ECC encoder 109 may comprise a single integrated circuit.

In one embodiment, a product code is used as an error correcting code for video data and audio data. The product code is used to encode a two-dimensional array of video data or audio data in the vertical and horizontal directions with an outer code and an inner code, respectively, so that data symbols can be doubly encoded. Reed-Solomon codes may be used as the outer code and the inner code.

The process performed by the ECC encoder 109 is described. Since the video data in the converted elementary stream has been variable-length coded, the length is non-uniform from one macroblock to another. In the packing and shuffling unit, a macroblock is put into a fixed frame. An overflow portion which extends beyond the fixed frame is sequentially put into an emptied area of the fixed frame.

The system data having information such as picture formats and versions of shuffling pattern is supplied from a system controller 121 as described later, and is input from an input terminal (not shown). The system data is fed to the packing and shuffling unit, and is recorded in the same manner as picture data. The system data is recorded as video AUX. Then, shuffling is performed such that macroblocks of one frame which are generated in the scan order are reorganized so that the recording positions of macroblocks on the tape are dispersed. The shuffling provides an improved refreshing ratio for the picture even if data is fragmentarily played back when played back at variable rates.

The video data and system data (hereinafter simply referred to as "video data" even if it contains the system data, unless necessary) from the packing and shuffling unit are supplied to a video outer encoder for encoding video data with the outer code, and outer parity is added thereto. The output of the outer encoder is shuffled by the video shuffling unit to reorder a plurality of ECC blocks for each sync block. The shuffling for each sync block prevents concentration of errors in a specific ECC block. The shuffling performed by the shuffling unit may be sometimes referred to as "interleave." The output of the video shuffling unit is written to the main memory.

As described above, on the other hand, the digital audio signal output from the SDTI receiver 108 or the delay unit 103 is fed to the ECC encoder 109. This embodiment handles uncompressed digital audio signal. The digital audio signal is not limited thereto, and may be input via an audio interface. An audio AUX may be further fed from an input terminal (not shown). The audio AUX represents auxiliary data having information relating to audio data such as the sampling frequency of audio data. The audio AUX is added to the audio data, and may be equivalent to audio data.

The audio data to which the audio AUX is added (hereinafter simply referred to as "audio data" even if it contains the audio AUX, unless necessary) is supplied to an audio outer encoder for encoding audio data with the outer code. The output of the audio outer encoder is supplied to the audio shuffling unit for shuffling. The audio shuffling includes shuffling for each sync block, and shuffling for each channel.

The output of the audio shuffling unit is written to the main memory. As described above, the main memory has the output of the video shuffling unit written thereto, and the audio data and the video data are combined within the main memory to form one channel data.

Data is read from the main memory, to which an ID having information indicating a sync block number is added, and is then supplied to the inner encoder. The inner encoder encodes the supplied data with the inner code. In response to the output of the inner encoder, a synchronization signal for each sync block is added to form recording data having a series of sync blocks.

The recording data output from the ECC encoder 109 is supplied to an equalizer 110 including a recording amplifier for conversion into a recording RF signal. The recording RF signal is delivered to a rotating drum 111 having a rotation head mounted thereto, and is recorded on a magnetic tape 112. A plurality of magnetic heads having different azimuths of heads which form adjacent tracks are mounted to the rotating drum 111.

The recording data may be scrambled, if necessary. It may also be digitally modulated when it is recorded, or may be Partial Response Class 4 coded and Viterbi coded. The equalizer 110 incorporates both a recording mechanism and a playback mechanism.

Figure 16:
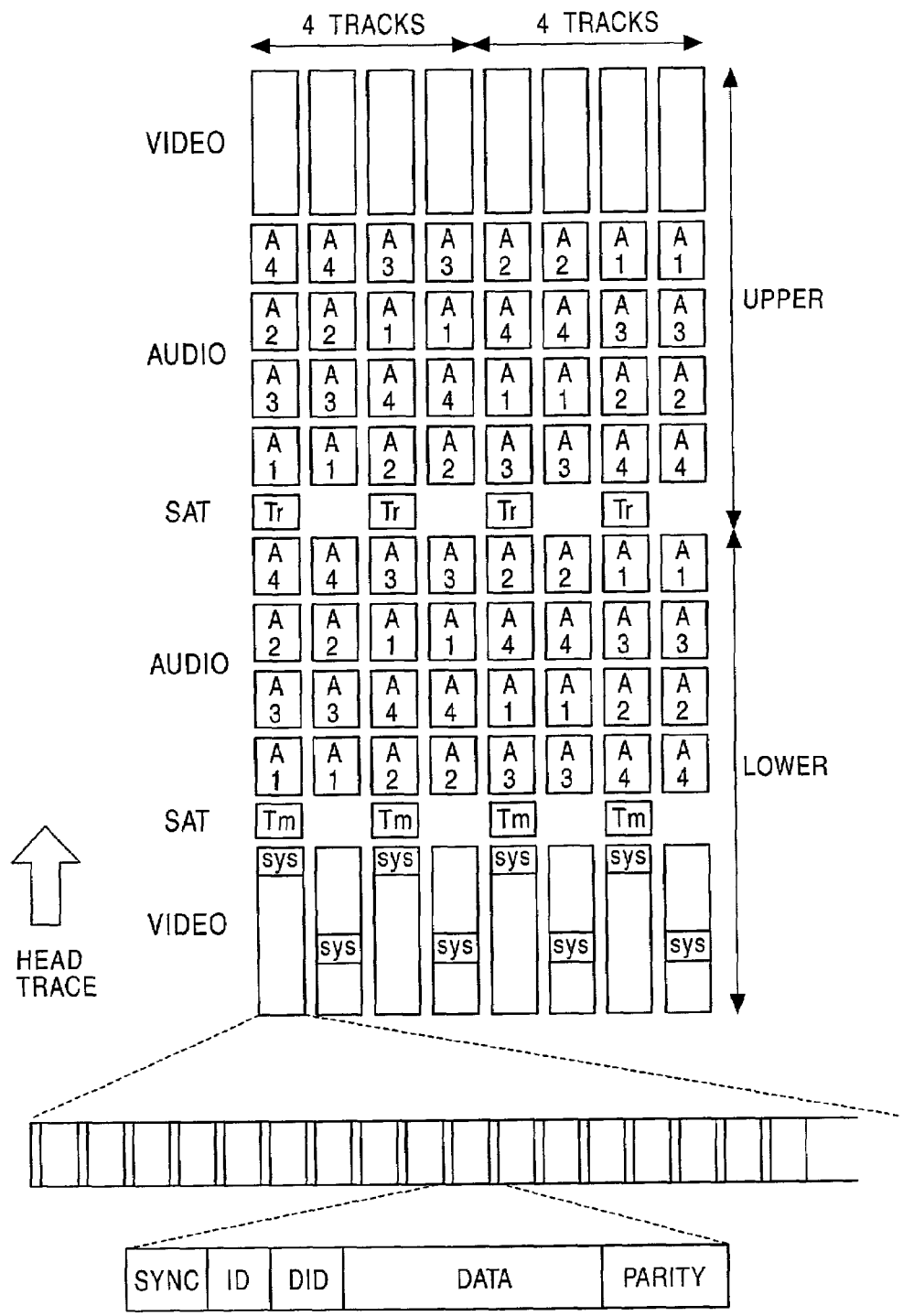
FIG. 16 is a schematic view of a track format formed on a magnetic tape.

FIG. 16 shows an example track format which is formed on a magnetic tape by the above-described rotation head. In this example, video and audio data of one frame are recorded in four tracks. Adjacent two tracks having different azimuths constitute one segment. That is, four tracks are composed of two segments. One set of tracks constituting a segment is labeled with track number [0] and track number [1] so as to correspond to the azimuths. Each of the tracks includes video sectors at both ends for recording video data, and an audio sector between the video sectors for recording audio data. FIG. 16 shows the locations of the sectors on the tape.

In this example, 4-channel audio data can be used. First to fourth channels of the audio data are indicated by symbols A1 to A4, respectively. The audio data are reordered for each segment before being recorded. In this example, the data corresponding to four error correcting blocks with respect to one track are interleaved, and are divided into an upper side sector and a lower side sector before being recorded.

The video sector in the lower side includes system areas (SYS). The system areas may be alternately located every track in the proximity to the leading end and in the proximity of the trailing end of the video sector in the lower side.

In FIG. 16, SAT indicates an area in which a servo lock signal is recorded. There are gaps between the recording areas.

While FIG. 16 shows an example where data per frame are recorded in four tracks, the data per frame can be recorded in 8 tracks, 6 tracks, or the like, depending upon the format of data to be recorded and played back.

Still referring to FIG. 16, each data recorded on the tape is composed of a plurality of blocks, called sync blocks, which are partitioned at an equal interval. Each sync block includes a SYNC pattern for synchronous detection, an ID for identifying the sync blocks, a DID indicating the content of the data subsequent thereto, data packets, and inner parity for error correction. The data is handled as packets for each sync block. In short, the minimum data unit to be recorded or played back corresponds to one sync block. For example, an array of multiple sync blocks may form a video sector.

Returning back to FIG. 15, the playback signal played back by the rotating drum 111 from the magnetic tape 112 is supplied to the playback system of the equalizer 110, including a playback amplifier, for playback. The playback signal is then equalized or wave-shaped in the equalizer 110. The playback signal is further digitally decoded or Viterbi decoded, if necessary. The output of the equalizer 110 is delivered to the ECC decoder 113.

The ECC decoder 113 performs processes inverse to the processes previously described with respect to the ECC encoder 109, and includes a main memory having a large capacity, an inner decoder, an audio deshuffling unit, a video deshuffling unit, and an outer decoder. The ECC decoder 113 further includes a deshuffling and depacking unit and a data interpolation unit for video decoding, and an audio AUX separating unit and a data interpolation unit for audio decoding. For example, the ECC decoder 113 may comprise a single integrated circuit.

The process performed by the ECC decoder 113 is described. The ECC decoder 113 first performs synchronous detection to detect synchronization signals supplied to the beginning of sync blocks to break the sync blocks. The playback data is supplied to the inner decoder for each sync block, on which an error correction is performed with the inner code. The output of the inner decoder is subjected to ID interpolation to interpolate the ID, such as sync block number, of the sync block in which an error is detected with the inner code. The playback data in which the ID is interpolated is separated into video data and audio data.

As described above, video data means DCT coefficient data and system data which are generated by intra-coding in MPEG, and audio data means PCM (pulse code modulation) data and audio AUX.

The separated audio data is delivered to the audio deshuffling unit for processing inverse to shuffling performed in the recording shuffling unit. The output of the deshuffling unit is supplied to the audio outer decoder for error correction with the outer code. The audio data which is subjected to error correcting is output from the audio outer decoder. An error flag would be set for the data containing an uncorrectable error.

The audio AUX is separated from the output of the audio outer decoder by the audio AUX separating unit, and the separated audio AUX is output from the ECC decoder 113 (the routing is omitted). The audio AUX is fed to, for example, the system controller 121 as described later. The audio data is supplied to the data interpolation unit. The data interpolation unit interpolates a sample containing an error. Interpolation methods include mean interpolation in which mean of temporally previous and next correct data is used for interpolation, and 0th-order pre-hold in which the previous correct sample value is held.

The output of the data interpolation unit corresponds to the output of the audio data from the ECC decoder 113, and the audio data output from the ECC decoder 113 is delivered to a delay unit 117 and an SDTI output unit 115. The delay unit 117 serves to absorb the delay due to the video data processed in an MPEG decoder 116 as described later. The audio data delivered to the delay unit 117 is supplied to an SDI output unit 118 with delay.

The separated video data is delivered to the deshuffling unit for the processing inverse to shuffling performed in the recording shuffling unit. The deshuffling unit deshuffles each sync block which has been shuffled by the recording shuffling unit. The output of the deshuffling unit is supplied to the outer decoder for error correction with the outer code. If an uncorrectable error is generated, an error flag indicating the presence or absence of an error indicates the presence of an error.

The output of the outer decoder is supplied to the deshuffling and depacking unit. The deshuffling and depacking unit deshuffles each macroblock which has been shuffled by the recording packing and shuffling unit. The deshuffling and depacking unit further depacks each macroblock which has been packed when it is recorded. More specifically, the length of data is recovered for each macroblock to restore the original variable length code. The deshuffling and depacking unit further separates the system data, which is then output from the ECC decoder 113 and is passed to the system controller 121 as described later.

The output of the deshuffling and depacking unit is delivered to the data interpolation unit, where the data in which an error flag is on, i.e., the data having an error, is corrected. If an error generated around the middle of macroblock data is detected before conversion, the DCT coefficients of the frequency components after the error position cannot be restored. Thus, for example, the DCT coefficients of the frequency components after the error position are set zero. Likewise, the only DCT coefficients having up to the length corresponding to the sync block length are restored during playback at a high rate, and the coefficients thereafter are replaced with zero data. Furthermore, if a header at the beginning of the video data contains an error, the data interpolation unit functions to recover the header (the sequence header, the GOP header, the picture header, or the user data).

The video data and the error flag output from the data interpolation unit correspond to the output of the ECC decoder 113, and the output of the ECC decoder 113 is supplied to a playback multi-format converter (hereinafter referred to as "playback MFC") 114. The playback MFC 114 performs a process inverse to the process performed by the recording MFC 106, and includes a stream converter. For example, the playback MFC 114 may comprise a single integrated circuit.

The stream converter uses the error flag from the data interpolation unit to add an EOB (End Of Block) signal in position to video data containing an error in order to truncate the data. Since the DCT coefficients are organized across DCT blocks from the DC component and low-frequency components to high-frequency components, the DCT coefficients can be thoroughly distributed over the DCT blocks constituting a macroblock from the DC component and low-frequency components if the DCT coefficients after a particular position are ignored.

The stream converter further performs a process inverse to the process performed by the recording stream converter. More specifically, the DCT coefficients which are organized on a frequency component basis for DCT blocks are reorganized for units of DCT block. The playback MFC 114 detects the sequence extension 3 from the supplied stream to extract chroma format information. When the above-noted reorganization of the DCT coefficients is performed by the stream converter, a timing control is performed based on the extracted chroma format information. Therefore, the playback signal is converted into an elementary stream complying with MPEG-2.

The input/output of the stream converter maintains a sufficient transfer rate (bandwidth) according to the maximum length of a macroblock as in the recording stream converter. If the length of macroblocks (slices) is not limited, the bandwidth three times the pixel rate is preferably maintained.

The output of the stream converter corresponds to the output of the playback MFC 114, and the output of the playback MFC 114 is supplied to the SDTI output unit 115 and the MPEG decoder 116.

The MPEG decoder 116 decodes the elementary stream to output video data. That is, inverse quantization and the inverse DCT are performed in the MPEG decoder 116. The decoded video data is fed to the SDI output unit 118. As described above, the audio data which is separated from the video data by the ECC decoder 113 is supplied to the SDI output unit 118 via the delay unit 117. In the SDI output unit 118, the supplied video data and audio data are mapped with the SDI format, and are converted into a stream having a data structure in the SDI format. The stream from the SDI output unit 118 is output through an output terminal 120 to the outside.

On the other hand, as described above, the audio data which is separated from the video data by the ECC decoder 113 is supplied to the SDTI output unit 115. In the SDTI output unit 115, the supplied video data as an elementary stream and the audio data are mapped with the SDTI format, and are converted into a stream having a data structure in the SDTI format. The converted stream is output through an output terminal 119 to the outside.

In FIG. 15, for example, the system controller 121 may comprise a microcomputer for controlling the overall operation of the recorder/player. The servo 122 communicates with the system controller 121 to control to travel the magnetic tape 112 or to drive the rotating drum 111.

Figure 17A:
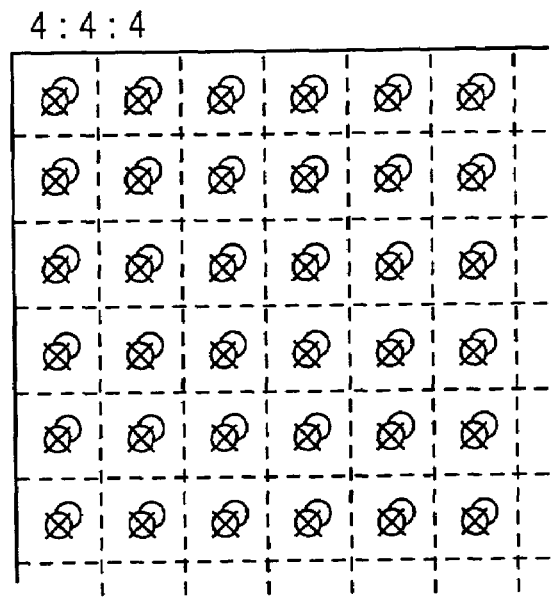
FIGS. 17A and 17B are schematic views of a chroma format.

Chroma formats are schematically described with reference to FIGS. 17A and 17B, FIGS. 18A and 18B, and FIGS. 18A and 18B which illustrate chroma formats 4:4:4, 4:2:2, and 4:2:0, respectively. FIGS. 17A, 18A, and 19A show the size and sampling phase of luminance signal Y and chrominance signals Cb and Cr. In the figures, symbol "x" denotes the phase of the luminance signal Y, and two overlapping circles denote the phase of the chrominance signals Cb and Cr.

FIG. 17A shows chroma format 4:4:4, in which a match is found in size and sampling phase between the chrominance signals Cb and Cr and the luminance signal Y. If four DCT blocks each including 8×8 pixels form one macroblock, as shown in FIG. 17B, the matrix of the chrominance signals Cb and Cr is created by four blocks having the same size as the matrix of the luminance signal y in the horizontal and vertical dimensions.

FIG. 18A shows chroma format 4:2:2, in which the size of the chrominance signals Cb and Cr is reduced by half the size of the luminance signal Y in the horizontal direction. In view of one macroblock, therefore, the matrix of the chrominance signals Cb and Cr is reduced by half the matrix of the luminance signal Y in the horizontal direction.

FIG. 19A shows chroma format 4:2:0, in which the size of the chrominance signals Cb and Cr is reduced by half the size of the luminance signal Y in both horizontal and vertical dimensions. In view of one macroblock, therefore, the matrix of the chrominance signals Cb and Cr is reduced by half the matrix of the luminance signal Y in both horizontal and vertical dimensions.

Figure 17B:
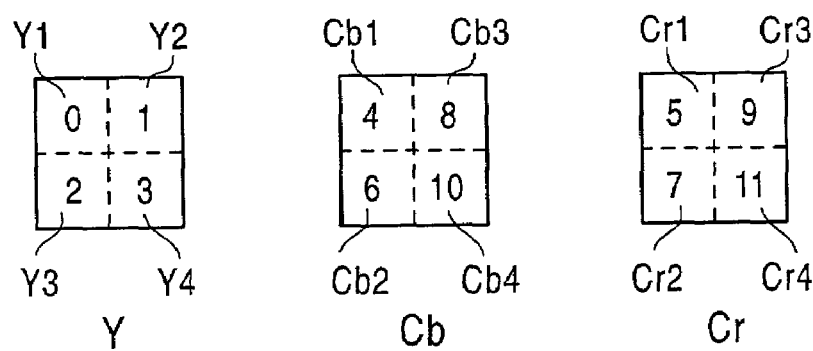
Figure 18A:
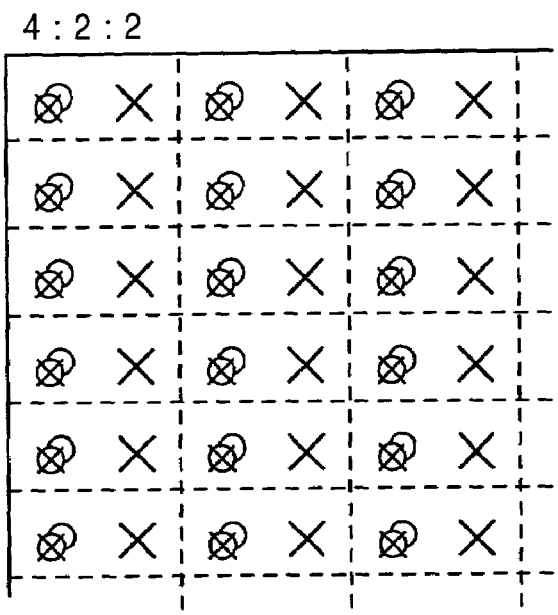
FIGS. 18A and 18B are schematic views of another chroma format.
Figure 18B:
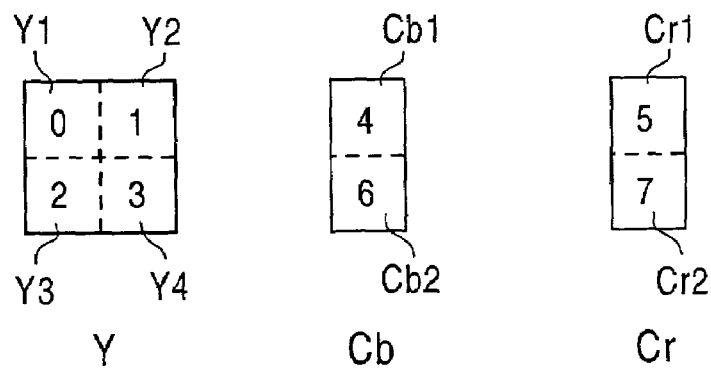
Figure 19A:
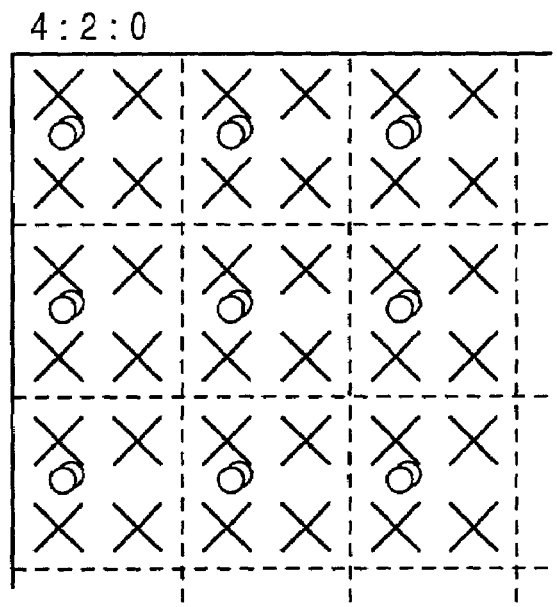
FIGS. 19A and 19B are schematic views of another chroma format.
Figure 19B:
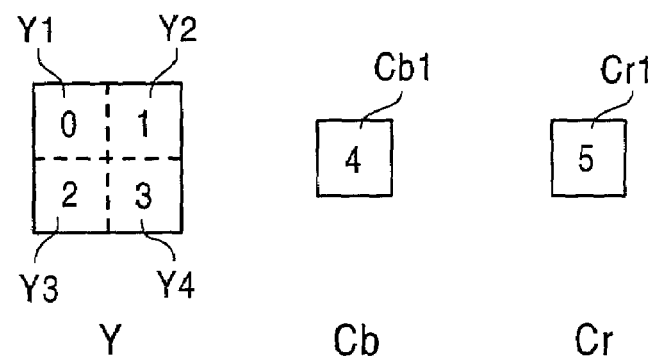

As shown in FIGS. 17B, 18B, and 19B, the DCT blocks forming each macroblock are numbered from the upper left corner. In chroma format 4:4:4, as shown in FIG. 17B, the blocks in each macroblock are encoded in the order of $Y_1$, $Y_2$, $Y_3$, $Y_4$, $Cb_1$, $Cr_1$, $Cb_2$, $Cr_2$, $Cb_3$, $Cr_3$, $Cb_4$, and $Cr_4$. In chroma format 4:2:2, as shown in FIG. 18B, the blocks in each macroblock are encoded in the order of $Y_1$, $Y_2$, $Y_3$, $Y_4$, $Cb_1$, $Cr_1$, $Cb_2$, and $Cr_2$. In chroma format 4:2:0, as shown in FIG. 19B, the blocks in each macroblock are encoded in the order of $Y_1$, $Y_2$, $Y_3$, $Y_4$, $Cb_1$, and $Cr_1$.

Figure 20A:
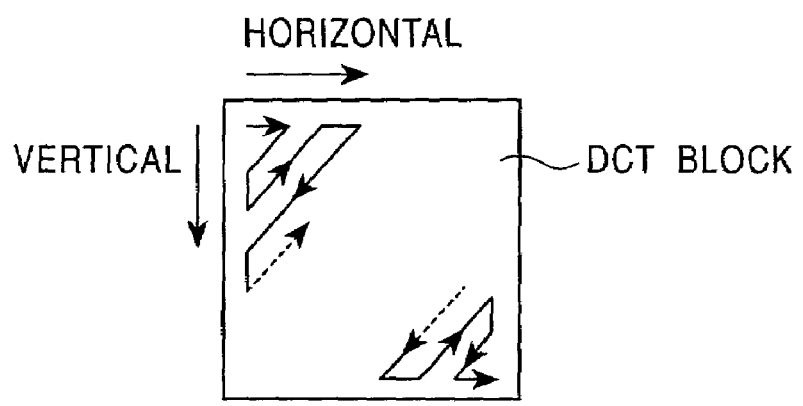
FIGS. 20A and 20B are schematic views which illustrate the output scheme of a video encoder, and variable-length coding.
Figure 20B:
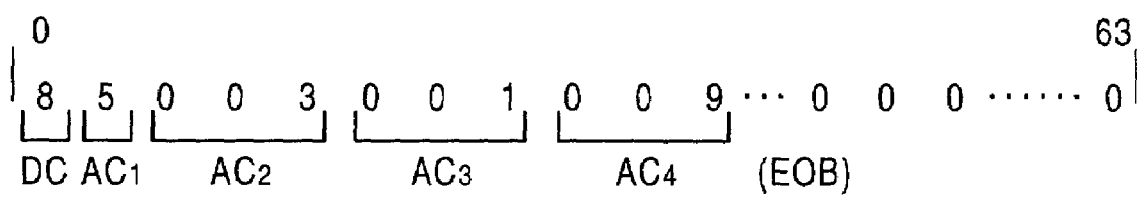

FIG. 20A shows the scan order of the DCT coefficients in the video data output from a DCT circuit in the MPEF encoder 102. MPEG ES output from the SDTI receiver 108 is the same. In the following description, the output of the MPEG encoder 102 is employed, by way of example. The DCT coefficients are output using a zigzag scan pattern from the upper left DC component in the DCT block toward the components having higher horizontal and vertical spatial frequencies. As a result, as an example shown in FIG. 20B, total 64 (8 pixels by 8 lines) DCT coefficients are organized in the order of frequency components.

The resultant DCT coefficients are variable-length coded by a VLC unit in the MPEG encoder 102. The first coefficient is fixed as the DC component, and codes are allocated to the remaining components (AC components) so as to correspond to a run of zeros followed by levels. Therefore, the variable-length coded outputs of the coefficient data of the AC components are organized from low-frequency (low-order) components to high-frequency (high-order) components, such as $AC_1$, $AC_2$, $AC_3$, etc. The variable-length coded DCT coefficients are contained in the elementary stream.

In the recording stream converter incorporated in the recording MFC 106, the DCT coefficients in the supplied signal are reorganized. Specifically, the DCT coefficients, which are organized in the order of frequency components for each DCT block by a zigzag scan, are reorganized in the order of frequency components across the DCT blocks constituting a macroblock.

Figure 21A:
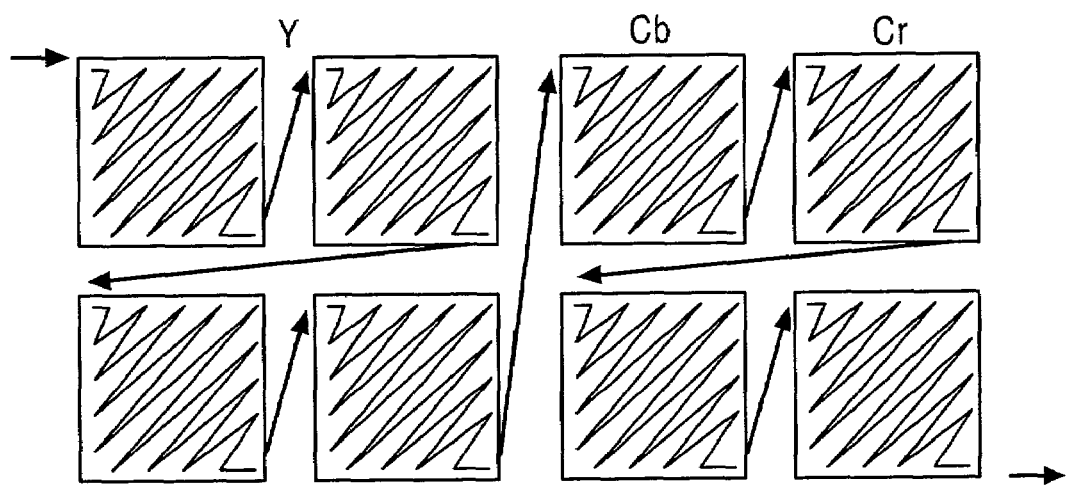
FIGS. 21A and 21B are schematic views which illustrate reorganization of the output data from the video encoder.
Figure 21B:
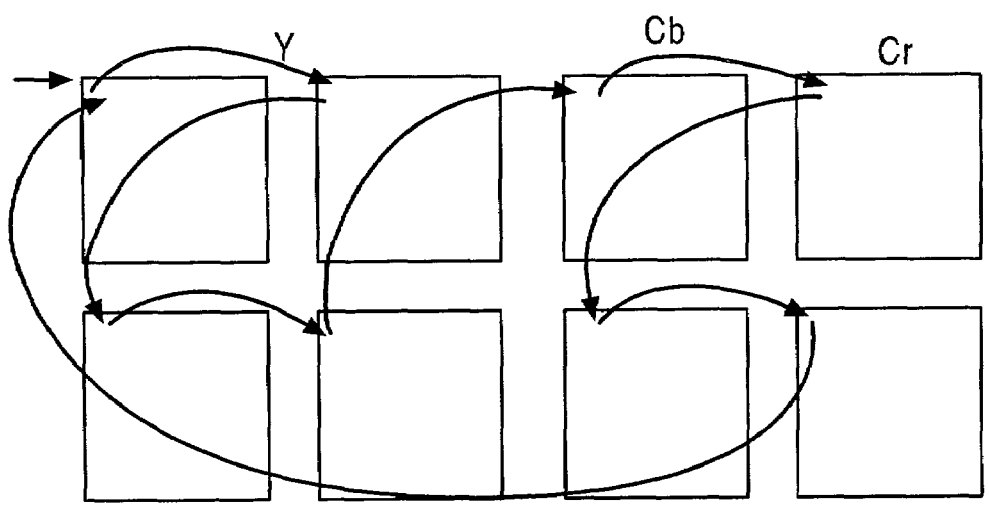

FIGS. 21A and 21B schematically show the reorganization of the DCT coefficients in the recording stream converter. For a (4:2:2) component signal, one macroblock is formed of four DCT blocks ($Y_1$, $Y_2$, $Y_3$, and $Y_4$) of the luminance signal Y, and two DCT blocks ($Cb_1$, $Cb_2$, $Cr_1$, and $Cr_2$) of each of the chrominance signals Cb and Cr.

As described above, in the MPEG encoder 102, through a zigzag scan according to the MPEG-2 algorithm, the DCT coefficients are organized in the order of frequency components from the DC component and low-frequency components to high-frequency components in each DCT block, as shown in FIG. 21A. When a scan of one DCT block is completed, another scan of the next DCT block is initiated to organize the DCT coefficients in the same way.

Therefore, the DCT coefficients are organized in the order of frequency components from the DC component and low-frequency components to high-frequency components in the DCT blocks $Y_1$, $Y_2$, $Y_3$, and $Y_4$, and the DCT blocks $Cb_1$, $Cr_1$, $Cb_2$, and $Cr_2$ of a macroblock. The DCT coefficients are then variable-length coded so that codes of [DC, $AC_1$, $AC_2$, $AC_3$, etc.] are allocated to the DCT coefficients so as to correspond to a set of run followed by levels.

The recording stream converter decodes the variable length code of the variable-length coded and organized DCT coefficients to detect the segmentation of the DCT coefficients, and groups the DCT coefficients on a frequency component basis for the DCT blocks constituting a macroblock. This process is shown in FIG. 21B. First, the DC components of eight DCT blocks in a macroblock are grouped, the lowest-frequency AC components of the eight DCT blocks are grouped, and the same-order AC components in the remaining coefficients are grouped in turn, so that the coefficient data can be reorganized across the eight DCT blocks.

The reorganized coefficient data is in the order of DC ($Y_1$), DC ($Y_2$), DC ($Y_3$), DC ($Y_4$), DC ($Cb_1$), DC ($Cr_1$), DC ($Cb_2$), DC ($Cr_2$), $AC_1$ ($Y_1$), $AC_1$ ($Y_2$), $AC_1$ ($Y_3$), $AC_1$ ($Y_4$), $AC_1$ ($Cb_1$), $AC_1$ ($Cr_1$), $AC_1$ ($Cb_2$), $AC_1$ ($Cr_2$), etc. As used herein, DC, $AC_1$, $AC_2$, etc. are variable length codes allocated to the set of run followed by levels, as described above with reference to FIG. 20B.

The converted elementary stream having coefficient data reordered in the recording stream converter is supplied to the packing and shuffling unit contained in the ECC encoder 109. The data length of a macroblock in converted elementary streams is the same as that in unconverted elementary streams. In the MPEG encoder 102, if the length is fixed for units of GOP (one frame) due to a bit rate control, the length varies for units of macroblock. In the packing and shuffling unit, the macroblock data are put into a fixed frame.

Figure 22A:
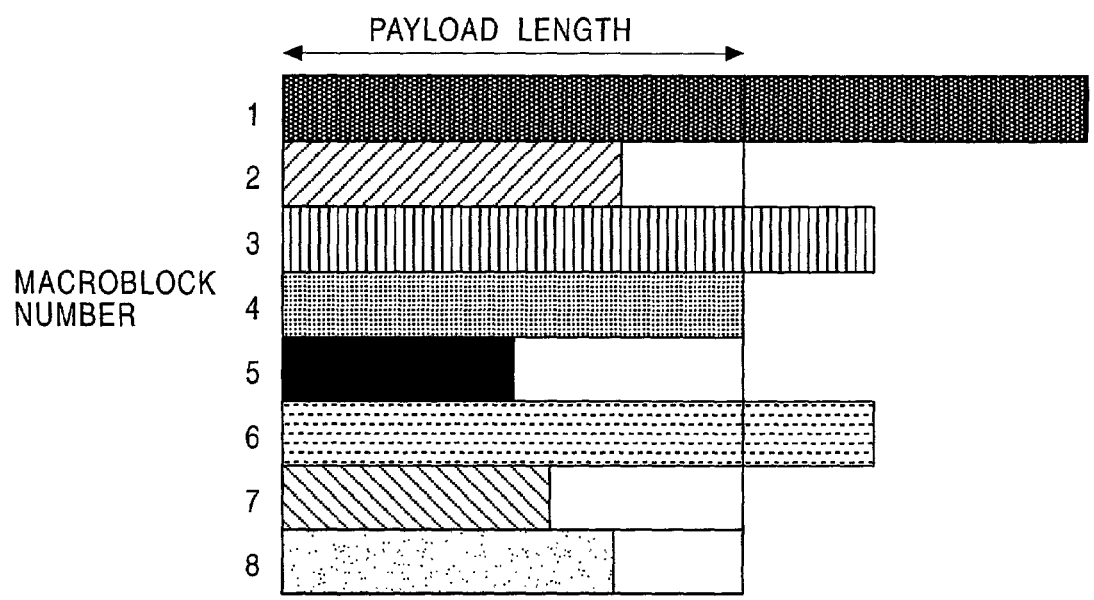
FIGS. 22A and 22B are schematic views which illustrate a process to pack reorganized data into a sync block.
Figure 22B:
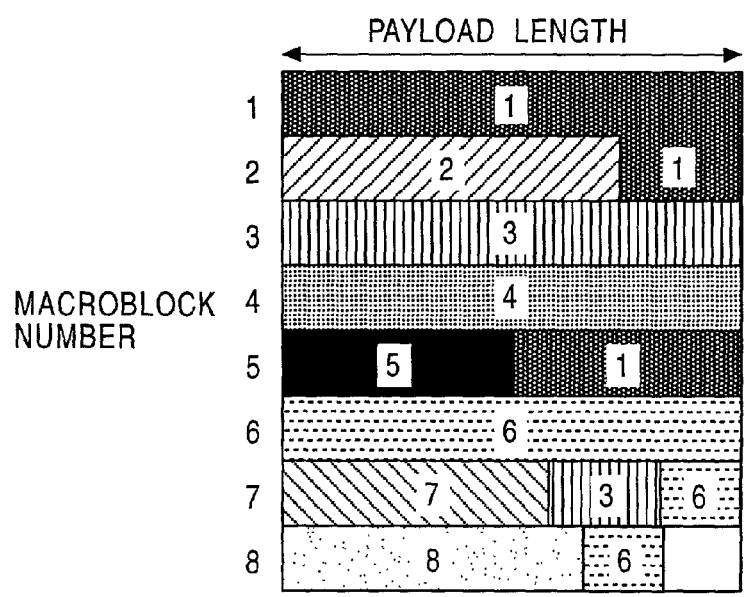

FIGS. 22A and 22B schematically show the packing process for a macroblock in the packing and shuffling unit. The macroblock is put into a fixed frame having a fixed data length, and is then packed. The data length of this fixed frame matches the data length of a payload which provides a data storage area in a sync block that is the minimum data unit for recording and playback. This is because shuffling and error correction encoding are simplified. For simplicity, one frame contains eight macroblocks in FIGS. 22A and 22B.

As an example shown in FIG. 22A, the lengths of the eight macroblocks are different after variable-length coding. In this example, the data lengths of macroblock 1, macroblock 3, and macroblock 6 are longer, and the data lengths of macroblock 2, macroblock 5, macroblock 7, and macroblock 8 are shorter than the length of the data area (payload) of one sync block or a fixed frame. The data length of macroblock 4 is the same as the length of the payload.

The packing process causes the macroblocks to be packed into a fixed length frame of the payload length. The data can be packed, without under- or overflowing, into the fixed frame because the quantity of data which is generated in one frame is controlled to be fixed. As an example shown in FIG. 22B, the macroblock having a longer length than the payload is divided at a position corresponding to the payload length. The portion (overflow portion) of the divided macroblock which overflows the payload length is packed into emptied regions from the top, i.e., is packed after the macroblock having a shorter length than the payload length.

In the example of FIG. 22B, the portion of macroblock 1 which overflows the payload length is first packed after macroblock 2, and is then packed after macroblock 5 once reaching the payload length. The portion of macroblock 3 which overflows the payload length is packed after macroblock 7. The portion of macroblock 6 which overflows the payload length is packed after macroblock 7, and the still overflowing portion is packed after macroblock 8. Accordingly, the macroblocks are packed in a fixed frame of the payload length.

The length of the variable-length coded data for each macroblock can be learned in advance in the recording stream converter. This enables the packing unit to know the end of the data of the macroblocks without decoding the VLC data to check the content.

As described above, in this embodiment, the DCT coefficients are reorganized in a macroblock, and the macroblock data is packed in a payload for units of one picture. This reduces the deterioration in picture quality even if a dropout of a tape, etc. cause an error beyond the error correction capability of the error correcting code due to.

Figure 23A:
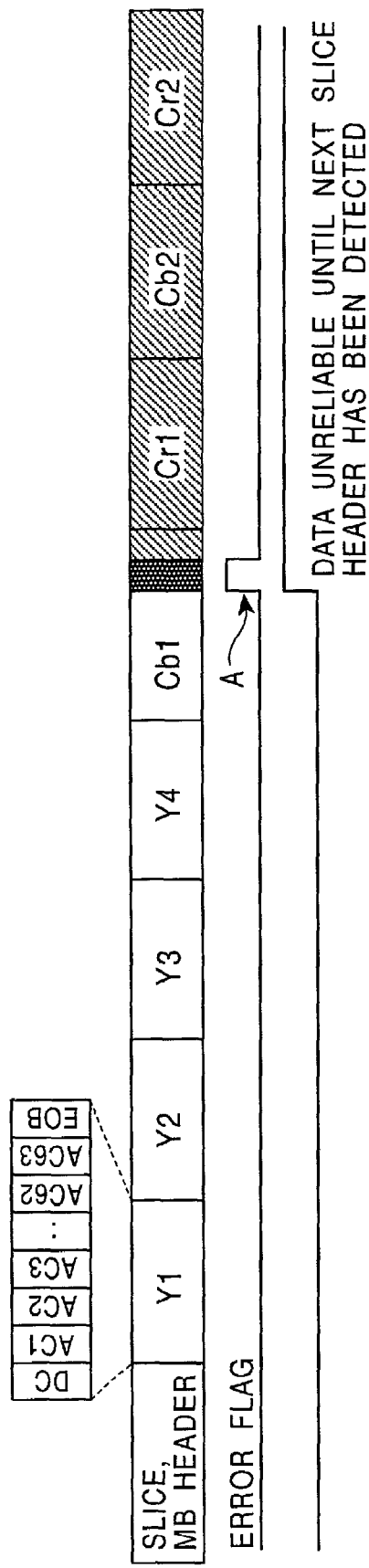
FIGS. 23A and 23B are schematic views which illustrate the advantages of reorganization of coefficients and the packing process.
Figure 23B:
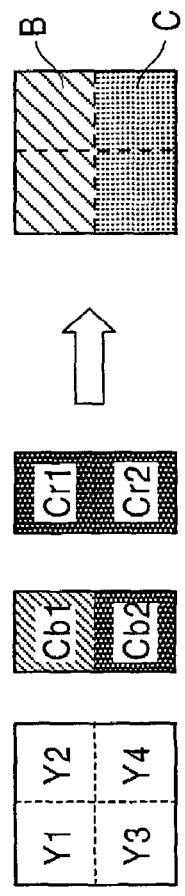

The advantages of the reorganization of coefficients and the packing process are described with reference to FIGS. 23A, 23B, 24A, and 24B. In the following description, chroma format 4:2:2 is employed, by way of example. FIGS. 23A and 23B show that the DCT blocks and the DCT coefficients are supplied in a similar manner to MPEG ES. In this case, as shown in FIG. 23A, after a slice header or a macroblock (MB) header, DCT blocks are organized in the order of the luminance signals $Y_1$ to $Y_4$, and the chrominance signals $Cb_1$, $Cr_1$, $Cb_2$, and $Cr_2$. In each of the blocks, the DCT coefficients are organized from the DC component and low-order AC components to high-order AC components.

As an example, it is assumed that an error occurs in a timing of position A in FIG. 23A beyond the error correction capability of the error correcting code, namely, a high-order coefficient of the block $Cb_1$. As previously described, a slice forms a single variable length code sequence in the MPEG algorithm. Once an error occurs, therefore, the data is unreliable from the error position until the next slice header has been detected. Therefore, the data after the position A in this macroblock cannot be decoded in the stream formed of one slice equal to one macroblock.

As a result, as an example shown in FIG. 23B, even the DC components of the chrominance signal blocks $Cr_1$, $Cb_2$, and $Cb_2$ cannot be restored. Since high-order components of the block $Cb_1$ and the other chrominance signal blocks cannot be restored, a picture having an incorrect color produced by the low-order coefficients of the block $Cb_1$ is created in section B corresponding to the blocks $Y_1$ and $Y_2$. A monochrome picture is created in section C corresponding to the blocks $Y_3$ and $Y_4$ since only the luminance signal is restored.

Figure 24A:
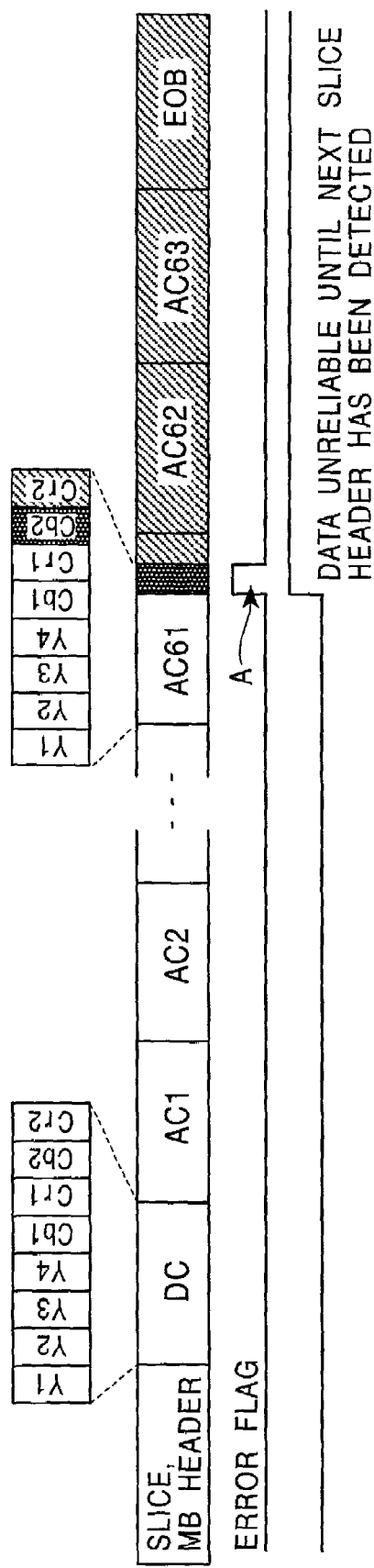
FIGS. 24A and 24B are schematic views which illustrate the advantages of reorganization of coefficients and the packing process.
Figure 24B:
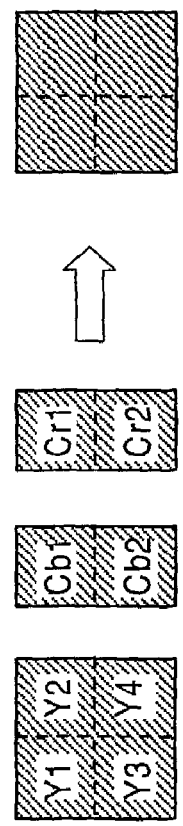

FIGS. 24A and 24B show a converted stream in which the DCT coefficients are reorganized according to the embodiment. As in FIGS. 23A and 23B, it is assumed that an error occurs at a position A. As an example shown in FIG. 24A, after a slice header or a macroblock header, blocks each having DCT coefficients grouped on a frequency component basis for DCT blocks are organized from the DC component and low-order AC components to high-order AC components.

The data after the error position A is unreliable until the next slice header has been detected, and the data after the error position A in this macroblock are not therefore restored. In this converted stream, however, the data which cannot be decoded due to the error correspond to the high-order AC components of the DCT coefficients in each DCT block, and the DC component and the low-order AC components of the DCT coefficients in each DCT block are uniformly provided. As shown in FIG. 24B, although the detail of a picture is dropped out because the high-order AC components are not restored, the above-described inconvenience with MPEG ES that a monochrome picture is created or a picture having an incorrect color which fails either of the two chrominance components can be substantially eliminated.

Therefore, the picture quality can be maintained to some extent even if the data stored in other fixed frames by the above-described packing process are not restored. This reduces deterioration in the quality of a picture played back at a high rate.

If an error occurs in the VLC data, the data is unreliable until the next header (start code) has been detected. In the VLC data, a data string is converted using a table in which different code lengths are allocated depending upon how frequently data appears. The variable-length coded data string in which only one bit is bit inverted would be possibly decoded as VLC data having different meaning. Therefore, the VLC data after an error would be unreliable even if it can be decoded, and must be discarded until reliable data appears. As described above, the start codes in the layers except for the macroblock layer are unique codes which are segmented in bytes. Therefore, once a start code has been detected, a recovery from an error can be achieved.

Figure 25:
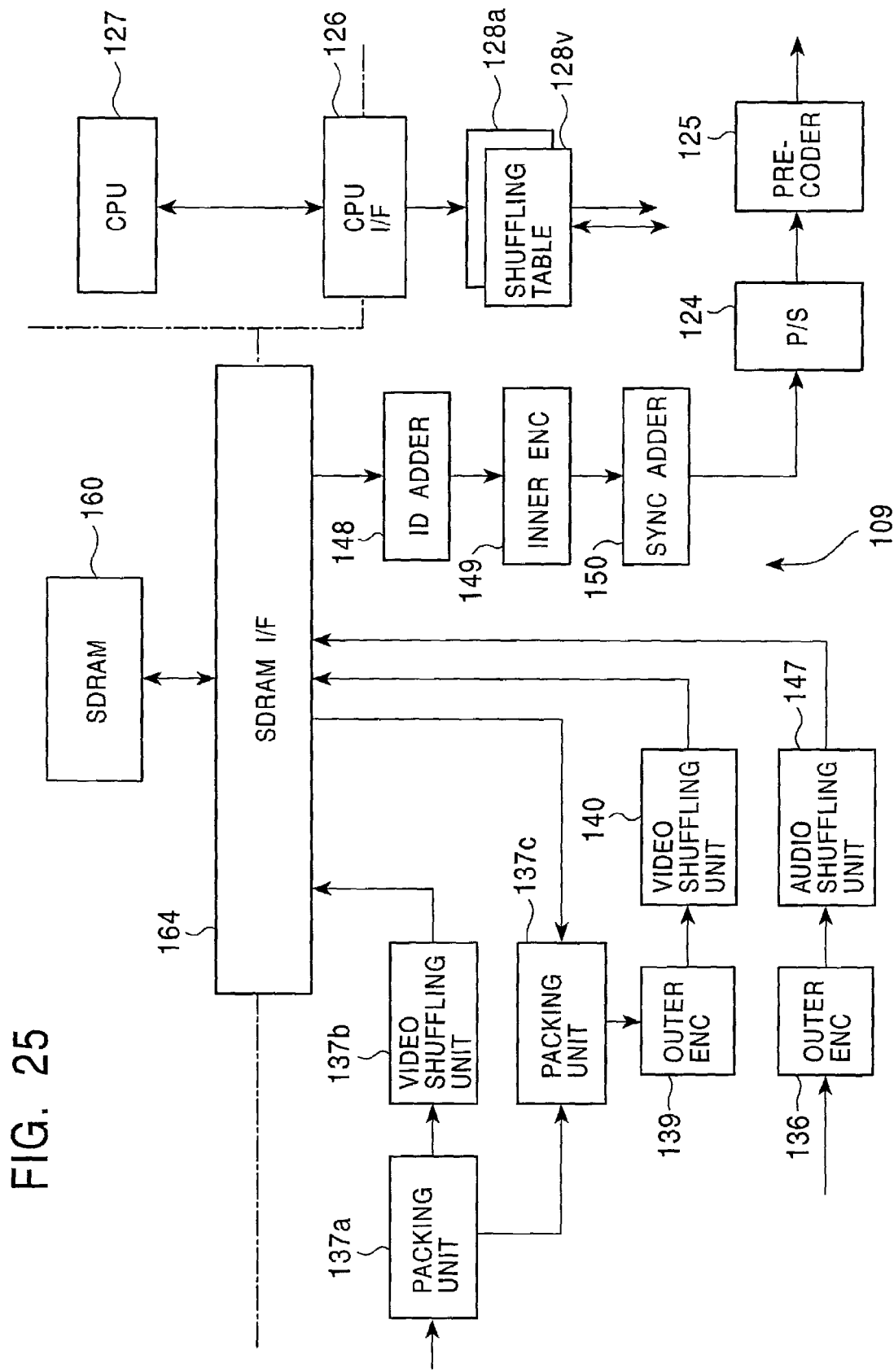
FIG. 25 is a block diagram specifically showing the structure of an ECC encoder.

FIG. 25 shows the more detailed structure of the ECC encoder 109. In FIG. 25, an interface 164 interfaces with a main memory 160 externally attached to the IC. The main memory 160 may comprise an SDRAM. The interface 164 relays a request from the internal components to the main memory 160, and allows data to be written/read to/from the main memory 160. A packing and shuffling unit 137 includes a packing unit 137a, a video shuffling unit 137b, and a packing unit 137c.

Figure 26:
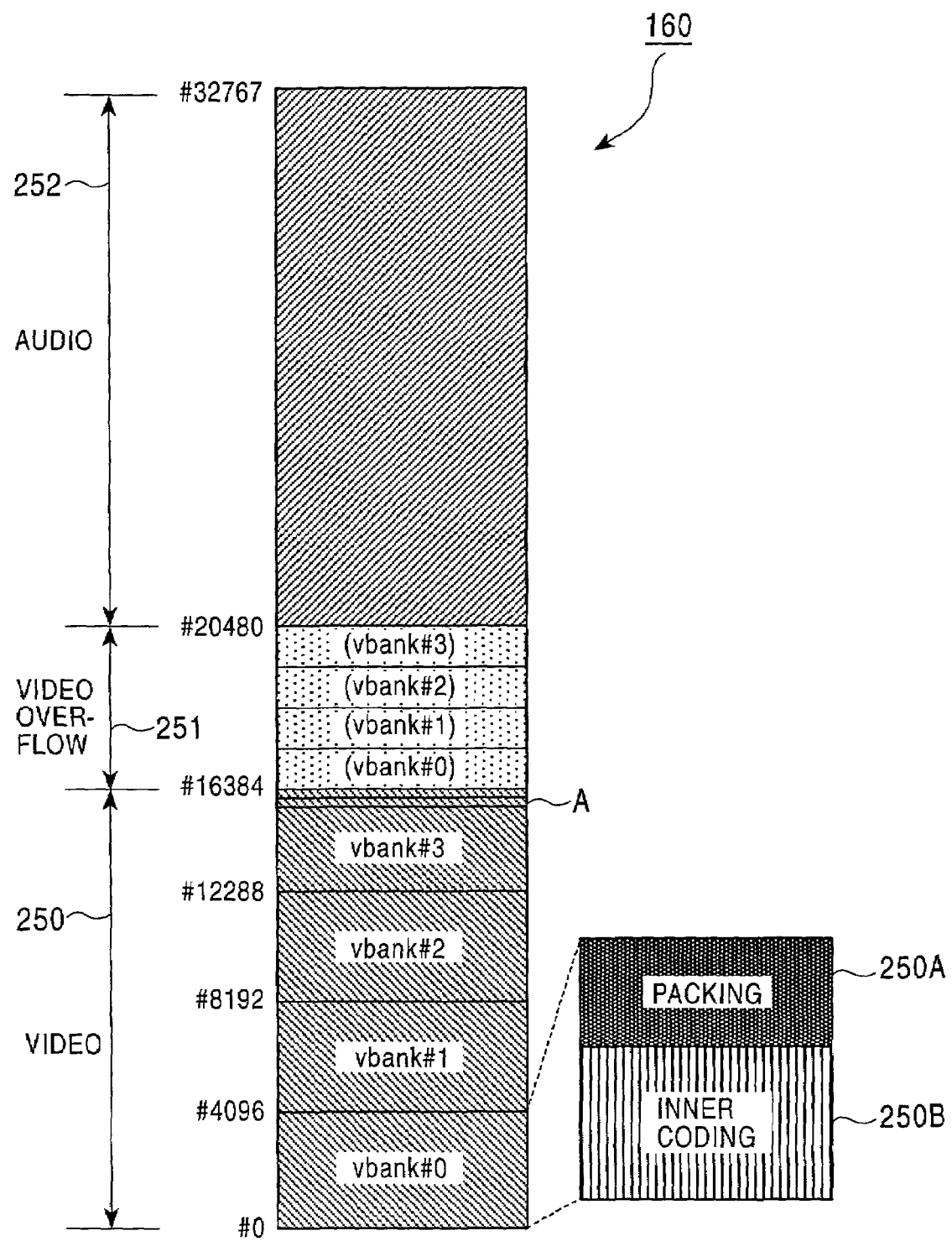
FIG. 26 is a schematic view of an example address configuration in a main memory.

FIG. 26 shows an exemplary address configuration of the main memory 160. The main memory 160 may comprise a 64-Mbit SDRAM. The main memory 160 has a video area 250, a video overflow area 251, and an audio area 252. The video area 250 is formed of four banks (vbank 0, vbank 1, vbank 2, and vbank 3). Each of the four banks can store a digital video signal of one equal-length code. One equal-length code is a unit for controlling the quantity of generated data at a substantially target value, and may be one picture of a video signal (I-picture). In FIG. 26, section A indicates a data section of one sync block of a video signal. A different number of bytes of data are inserted in one sync block from one format to another. In order to support a plurality of formats, the data size of one sync block is through to be more than the maximum bytes and to be bytes suitable for processing, such as 256 bytes.

Each of the banks vbank 0 to vbank 4 in the video area 250 is subdivided into a packing area 250A and an output area 250B to the inner encoder. The video overflow area 251 is composed of four banks to correspond to the video area 250. The audio area 252 in the main memory 160 is provided for processing audio data.

In this embodiment, the packing unit 137a separately stores the fixed frame length data and the overflow data that overflows the fixed frame in different areas of the main memory 160 by referring to a data length flag in each macroblock. The fixed length data is data having a smaller length than the length of the data area (payload) of a sync block, and is hereinafter referred to as "block length data." The block length data is stored in the packing area 250A in each bank. A data length shorter than the block length may provide an emptied area in the corresponding area of the main memory 160. The video shuffling unit 137b controls write addresses for shuffling. It is noted that the video shuffling unit 137b only shuffles the block length data, and the overflow data is not shuffled and is written to an area allocated to the overflow data.

Then, the packing unit 137c packs and writes the overflow data in a memory of an outer encoder 139. The block length data is written to a memory of one ECC block which is prepared in the outer encoder 139 from the main memory 160, and the overflow data may be written to an emptied region of the block so that that block may be filled with data. Once data of one ECC block is completely written, the write process is temporarily interrupted, and the outer encoder 139 generates outer parity. The outer parity is stored in a memory of the outer encoder 139. When one ECC block has been completely processed in the outer encoder 139, the data from the outer encoder 139 and the outer parity are reordered for inner encoding, and are rewritten to the output area 250B separate from the packing area 250A of the main memory 160. A video shuffling unit 140 controls the address when the outer-coded data is rewritten to the main memory 160 for shuffling for each sync bloc.

Such processes are performed for units of ECC block, including a first packing process to separately write the block length data and the overflow data to the first area 250A of the main memory 160, a second packing process to pack and write the overflow data in a memory of the outer encoder 139, a process to generate outer parity, and a process to rewrite the data and the outer parity in the second area 250B of the main memory 160. Since the outer encoder 139 includes a memory having a ECC block size, the main memory 160 may be less frequently accessed.

When a predetermined number of ECC blocks (for example, 32 ECC blocks) included in one picture have been completely processed, the packing process and outer coding on that picture are completed. Then, the data read from the area 250B of the main memory 160 via the interface 164 is processed by an ID adder 148, an inner encoder 149, and a synchronization adder 150, and the resulting data is converted into bit serial data by a parallel-serial converter 124. The output serial data is then processed by a Partial Response Class 4 precoder 125. The output from the precoder 125 is digitally modulated, if necessary, and is then delivered to the rotation head on the rotating drum 111.

A sync block, called a null sync, which does not include valid data is introduced in an ECC block so that the ECC block may be flexibly constructed regardless of different formats of the recording vide signals. The null sync is generated by the packing unit 137a in the packing and shuffling unit 137, and is written to the main memory 160. Since the null sync includes a data recording area, it can be used as a recording sync for the overflow data.

For audio data, even-numbered samples and odd-numbered samples of audio data in one field separately constitute different ECC blocks. Since an outer code sequence of an ECC block is constituted by entry-sequenced audio samples, the outer encoder 136 generates outer parity each time an audio sample in the outer code sequence is entered. The shuffling unit 137 controls the address when the output of the outer encoder 136 is written to the area 252 of the main memory 160 for shuffling for units of channel and for units of sync block.

A CPU interface 126 is further provided for receiving data from an external CPU 127 functioning as a system controller so that parameters can be set for the internal blocks. In order to support a plurality of formats, a great number of parameters including a sync block length and a parity length can be set.

One parameter is "packing length data" which is transmitted to the packing units 137a and 137c. The packing units 137a and 137c pack the VLC data into a fixed frame (a length referred to as "payload length" shown in FIG. 22A) which is determined based on this parameter.

Another parameter is "number-of-pack data" which is transmitted to the packing unit 137c. The packing unit 137c determines the number of packs per sync block, and delivers the data corresponding to the determined number of packs to the outer encoder 139.

Another parameter is "number-of-video-outer-parity data" which is transmitted to the outer encoder 139. The outer encoder 139 encodes, using the outer code, the video data in which the number of parities based on this parameter is generated.

The parameters include "ID information" and "DID information" which are transmitted to the ID adder 148. The ID adder 148 adds the ID information and the DID information to the data stream having a unit length read from the main memory 160.

The parameters include "number-of-video-inner-parity data" and "number-of-audio-inner-parity data" which are transmitted to the inner encoder 149. The inner encoder 149 encodes, using the inner code, the video data and the audio data in which the number of parities based on these parameters are generated. Another parameter, namely, "sync length data" is also transmitted to the inner encoder 149, and a unit length (sync length) of the inner-coded data is defined based on this parameter.

Another parameter is "shuffling table data" which is stored in a video shuffling table (RAM) 128v and an audio shuffling table (RAM) 128a. The video shuffling table 128v performs an address conversion to help the video shuffling units 137b and 140 shuffle. The audio shuffling table 128a performs an address conversion to help the audio shuffling unit 137 shuffle.

In this embodiment, the continuity of macroblock addresses is checked when the VLC data in the MPEG stream is decoded. As a result, if a discontinuous macroblock address is present, the discontinuous portion is corrected for so that the macroblock addresses may be continuous. A description of how to correct for a discontinuous portion of macroblocks is now made with reference to FIGS. 27A to 27D, 28, and 29A to 29D.

Figure 27B:
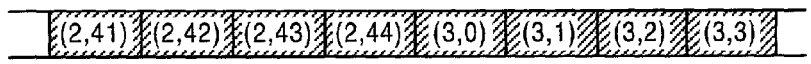
FIGS. 27A to 27D are schematic views which illustrate an example where macroblock addresses are discontinuous.
Figure 27C:
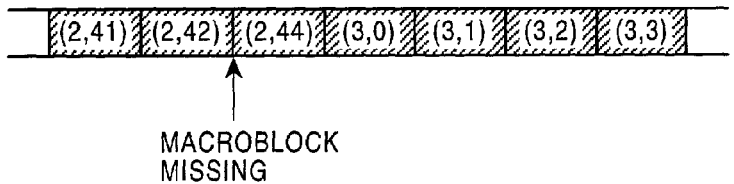
Figure 27D:
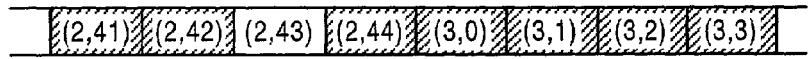
Figure 27A:
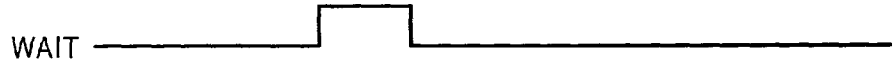

FIGS. 27A to 27D show an example in which an MPEG stream is suddenly interrupted for some reason resulting in missing data, in which case a macroblock is missing. The macroblock addresses shown in FIGS. 27A to 27D conform to the 625/50 standard. As shown in FIG. 27A, one screen is broken into macroblocks having 38 rows by 45 columns, each macroblock having 16 pixels by 16 lines. Coordinates (yy, xx) in the blocks shown in FIG. 27A are expressed by (mb_row, mb_column) as described above, based on the location of the macroblocks on the screen.

In an MPEG stream which is formed of I-pictures, the macroblocks must be orderly and fully transmitted, as previously described. If macroblocks are arranged on one screen in the manner shown in FIG. 27A, in the data stream in which I-pictures are transmitted, it is expected that, for example, shaded macroblocks shown in FIG. 27A are transmitted in the order of (2,41), (2,42), (2,43), (2,44), (3,0), (3,1), (3,2), and (3,3), as shown in FIG. 27B, by way of example.

If data in the MPEG stream is missing, that is, for example, macroblock (2,43) is missing, the previous macroblock (2,42) is transmitted before the next macroblock (2,44) in the MPEG stream, as shown in FIG. 27C.

In this embodiment, as shown as an example in FIG. 27D, the MPEG stream is temporarily interrupted at the point where data is missing, that is, a macroblock is missing, and the missing portion is replaced with a macroblock having the inherent macroblock address so that the macroblock addresses may be continuous. For example, a "wait" signal corresponding to the period of the missing macroblock is generated for a predetermined time. In response to the "wait" signal, processing of the macroblocks is stopped to output a replacement macroblock for that period.

The replacement macroblock may be implemented, for example, as an MPEG stream which displays gray. FIG. 28 shows an exemplary replacement macroblock which displays gray. The replacement macroblock is not limited to a macroblock which displays gray, but may be a macroblock which displays block etc. The values shown in FIG. 28 are illustrative only, and are not intended to be limiting.

FIGS. 29A to 29D show another example in which macroblock addresses are discontinuous. As in FIG. 27A, macroblock addresses shown in FIG. 29A also comply with the 625/50 standard. As shown as an example in FIG. 29C, some macroblocks (in this example, macroblocks (2,39) and (2,43)) are exchanged in the MPEG stream (see FIG. 29B) corresponding to the screen shown in FIG. 29A.

Figure 29B:
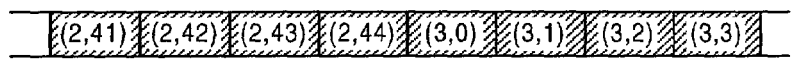
FIGS. 29A to 29D are schematic views which illustrate an example where macroblock addresses are discontinuous.
Figure 29C:
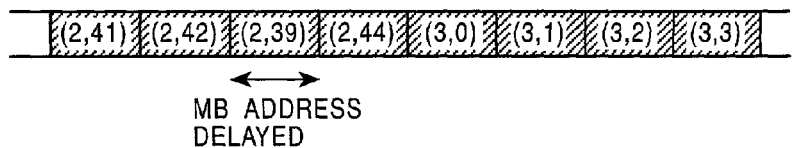
Figure 29D:
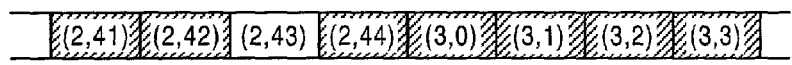
Figure 29A:
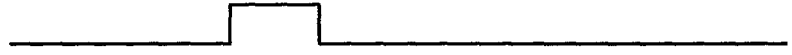

In this case, as shown in FIG. 29D, the input MPEG stream is pulled out at the highest rate until the slice_start_code has been sensed to detect a macroblock having a correct macroblock address. The portion of the output MPEG stream in which the MPEG stream is pulled out, that is, is missing, is replaced with, for example, a macroblock shown in FIG. 28 which displays gray. For example, a "next_macroblock_address" signal corresponding to the period of a macroblock having a macroblock address of which the position is exchanged is generated. For the period of "next_macroblock_address" signal, the input stream is pulled out at the highest rate and the replacement macroblock is output.

The replacement macroblock is not limited to a macroblock which displays gray, but may be a macroblock which displays block etc. The process of pulling out the MPEG stream and replacing it with a macroblock is repeated until the macroblock address of the input MPEG stream returns to the correct value.

Therefore, if a discontinuous macroblock address is present in the input MPEG stream because the macroblock is missing or exchanged, the process according to this embodiment can be applied in order to achieve an output MPEG stream in which the macroblock addresses are continuous as well as to avoid syntax errors. According to this embodiment, therefore, it is possible to provide a stable system.

Figure 30:
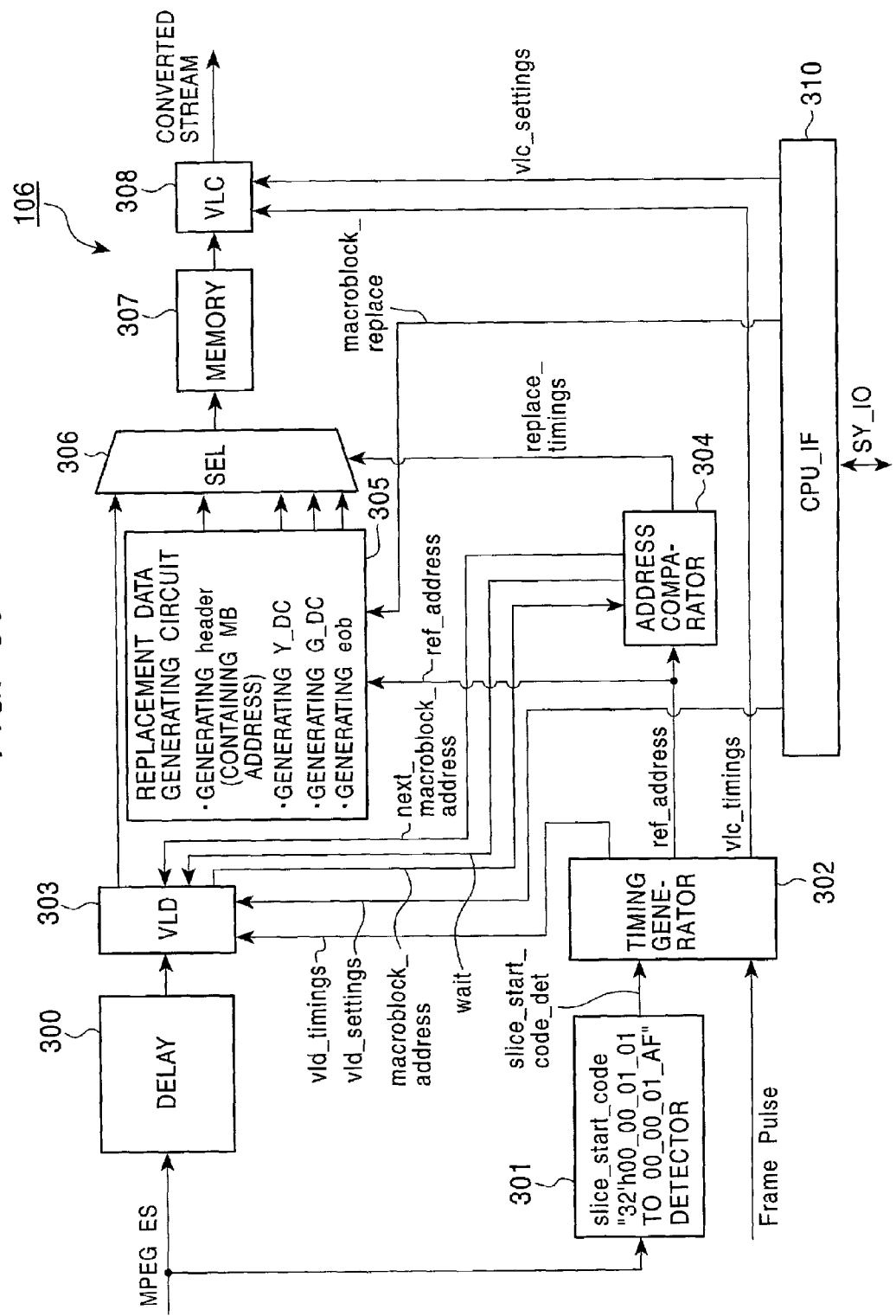
FIG. 30 is a block diagram of an exemplary recording MFC according to an embodiment of the present invention.

The above-described process of correcting macroblock discontinuities is executed in the recording MFC 106 during recording. FIG. 30 shows the structure of the recording MFC 106 according to this embodiment, by way of example. During recording, the MPEG ES which is output from the SDTI receiver 108 or the MPEG encoder 102 is input to the recording MFC 106 where the MPEG ES is then supplied to a delay circuit 300 and a detection circuit 301.

The correction process for macroblocks may also be executed during playback. During playback, this process is executed in the playback MFC 114, which has the same configuration as that of the recording MFC 106. More specifically, during playback, the converted ES which is output from the ECC decoder 113 is fed to the playback MFC 114 where the ES is then supplied to a delay circuit 300 and a detection circuit 301. Since the processes executed in the recording MFC 106 and the playback MFC 114 are substantially the same, the process executed in the recording MFC 106 is principally described herein.

In FIG. 30, a CPU_IF 310 is an interface for controlling communication between the recording MFC 106 and the system controller 121. A variety of instructions and data which are output from the system controller 121 are delivered to the components in the recording MFC 106 via the CPU_IF 310.

The detection circuit 301 detects the slice start code 12 in the supplied MPEG ES. The slice start code 12 is a 4-byte (32-bit) code segmented in bytes. The last one byte indicates vertical position information of that slice, ranging from [00 00 01 01] to [00 00 01 AF]. The detection circuit 301 can therefore detect the slice start code 12 using, for example, pattern matching on each byte. As described above, since one slice corresponds to one macroblock in this embodiment, the beginning of a macroblock can be detected by finding the slice start code 12.

A result of the detection by the detection circuit 301 is output as a "slice_start_code_det" signal, and is then supplied to a timing generator 302. A frame pulse which is synchronous with a frame is also supplied to the timing generator 302. The frame pulse may be generated by the timing generator 104 (see FIG. 15) based on the reference signal supplied from the terminal 105.

The timing generator 302 outputs "vld_timings" and "vlc_timings" signals which are reset in response to the "slice_start_code_det" signal and which repeat every macroblock. The "vld_timings" and "vlc_timings" signals are control signals defining the block types which depend upon luminance signals $Y_1$, $Y_2$, $Y_3$, and $Y_4$, and chrominance signals $Cb_1$, $Cr_1$, $Cb_2$, and $Cr_2$, which constitute a macroblock, the DC component and AC components in the DCT coefficients contained in each block, and the header types. The "vld_timings" and "vlc_timings" signals are supplied to a variable length decoder 303 and a variable length coder 308, respectively, as described later.

The timing generator 302 also generates a reference macroblock address "ref_address" (hereinafter referred to as reference MB address "ref_address") which is reset in response to the frame pulse and which increments every macroblock.

As described above, once the screen size is defined, the number of macroblocks per screen is uniquely determined. The macroblocks are sequentially transmitted left-to-right and top-to-bottom across the screen. The reference MB address "ref_address" can thus be defined using, for example, the frame pulse as an origin. The reference MB address "ref_address" is a continuous value which uses the macroblock at the upper left corner of the screen, numbered as zero, and which increments by one as it is shifted from the left to the right on the screen and which increments as it is shifted from the top to the bottom on the screen. The generated reference MB address "ref_address" is supplied to a first input terminal of an address comparator 304.

The reference MB address "ref_address" is also supplied to a replacement data generating circuit 305 as described later.

The MPEG ES supplied to the delay circuit 300 is delayed in order to absorb a delay detected by the detection circuit 301 and the like as described later, and is then phase-adjusted and output. The MPEG ES output from the delay circuit 300 is supplied to a variable length decoder (VLD) 303 for decoding a variable length code.

A "vld_settings" signal which indicates the decoding mode of the variable length code is sent to the recording MFC 106 from the system controller 121. The "vld_settings" signal is passed to the VLD 303 via the CPU_IF 310. The VLD 303 interprets the input MPEG ES based on the "vld_settings" signal. Then, the VLD 303 decodes the variable length code of the MPEG ES based on the time slot indicated by the "vld_timings" signal supplied from the timing generator 302.

It is noted that, in the playback MFC 114, a "vld_settings" signal indicating a time slot corresponding to the data organization of the converted stream is supplied to the VLD 303 from the timing generator 302.

The stream in which the variable length code of the MPEG ES has been decoded is input to a first input terminal of a selector 306. The replacement data output from the replacement data generating circuit 305 (described later) is supplied to a second input terminal of the selector 306. The selector 306 selects either the first or second input terminal based on a "replace—timings" signal which is a timing signal output from the address comparator 304 (described later), and the input signals are switched accordingly.

The VLD 303 decodes the variable length code of the MPEG ES, as described later, to provide a macroblock address (hereinafter referred to as "MB address") "macroblock_address" for each macroblock. The MB address "macroblock_address" is passed to a second input terminal of the address comparator 304.

The address comparator 304 compares the reference MB address "ref_address" supplied by the timing generator 302 with the MB address "macroblock_address" supplied by the VLD 303. Based on a result of the comparison, the above-noted "wait" signal or "next_macroblock_address" signal is output, and the "replace_timings" signal is also output.

The operation of the address comparator 304 is described in more detail.

As a result of the comparison between the reference MB address "ref_address" and the MB address "macroblock_address," if (reference MB address "ref_address" <MB address "macroblock_address"), then it is determined that the corresponding macroblock is missing and the corresponding address is skipped. Then, the address comparator 304 outputs the "wait" signal indicating the period of the corresponding macroblock, and instructs the VLD 303 to stop pulling out the input stream until the "macroblock_address" signal is correct.

In addition, the address comparator 304 further outputs a replacement timing signal "replace_timings" indicating the timing at which the stream is replaced. The replacement timing signal "replace_timings" is supplied to the selector 306 as a selection control signal.

The operation of the VLD 303 is temporarily stopped in response to the "wait" signal, that is, by outputting the "wait" signal and by stopping the "vld_timings" signal output from the timing generator 302. If the "vld_timings" signal is not supplied to the VLD 303, the operation of the VLD 303 is stopped. The "wait" signal may be also used to stop the "vld_timings" signal on the VLD 303.

As a result of the comparison between the reference MB address "ref_address" and the MB address "macroblock_address," if (reference MB address "ref_address" >MB address "macroblock_address"), then it is determined that the corresponding macroblock has an address of which the position is exchaged. Then, the address comparator 304 outputs the "next_macroblock_address" signal indicating the period of the corresponding macroblock, and instructs the VLD 303 to pull out the input stream at the highest rate until the next slice is found.

In addition, the address comparator 304 further outputs a replacement timing signal "replace_timings" indicating the timing at which the stream is replaced. The replacement timing signal "replace_timings" is supplied to the selector 306 as a selection control signal.

In the foregoing description, the input stream is pulled out at the highest rate until the next slice. More specifically, in order to overcome a problem that the positions of MB addresses are exchanged, in the example shown in FIGS. 29A to 29D, it is required that a replacement macroblock which has an MB address corresponding to macroblock (2,43) and which displays gray be output instead of the exchanged macroblock (2,39) while a macroblock having an address corresponding to macroblock (2,44) subsequent to macroblock (2,43) is searched for.

Therefore, when the "next_macroblock_address" signal indicates that macroblock (2,43) is a macroblock having an address of which the position is exchanged, for example, the stream accumulated in the delay circuit 300 is prefetched and is retrieved into the VLD 303. The VLC data of the retrieved stream is decoded by the VLD 303 to determine whether or not there is a macroblock having an MB address corresponding to macroblock (2,44).

The replacement data generating circuit 305 generates and prepares in advance the data to be replaced with the missing macroblock based on a "macroblock_replace" signal which is supplied via the CPU_IF 310 under the control of the system controller 121. The data which is prepared by the replacement data generating circuit 305 may be the data depicted in FIG. 28, each data including slice and macroblock header information containing macroblock addresses, the DC component for each of the luminance and chrominance in the macroblock, and EOB (End Of Block) data indicating the end of the DCT blocks.

In these data, the last one byte of the slice start code 12 which indicates the vertical address of a macroblock, and macroblock—escape and macroblock_address_increment which indicate the horizontal address are created based on the position of that macroblock on the screen, that is, the reference MB address "ref_address."

As described above, the first and second input terminals of the selector 306 are switched based on the "replace_timings" signal which is a timing signal supplied from the address comparator 304. Thus, missing macroblock data in the stream supplied by the VLD 303 is replaced with the replacement macroblock data which is supplied by the replacement data generating circuit 305, so that the stream is corrected.

The stream output from the selector 306 is written to a memory 307. The stream written to the memory 307, of which the address is controlled by a variable length coder (VLC) 308, is read. The read address from the memory 307 is controlled by the VLD 308 according to the "vlc_settings" signal supplied to the VLD 308 from the system controller 121 via the CPU_IF 310, and the "vlc_timings" signal supplied from the timing generator 302, thereby allowing the data to be reorganized and output.

The data for which the alignment has been converted and which is read from the memory 307 is variable-length coded by the VLC 308, and is also 8 or 16 bit aligned and is output as a converted ES.

It is noted that, in the playback MFC 114, a "vlc_timings" signal indicating a time slot of data organization of the MPEG ES is supplied to the VLC 308. The stream supplied to the VLC 308 in which the data have been reordered according to the "vlc_timings" signal is output as an MPEG ES.

Figure 31:
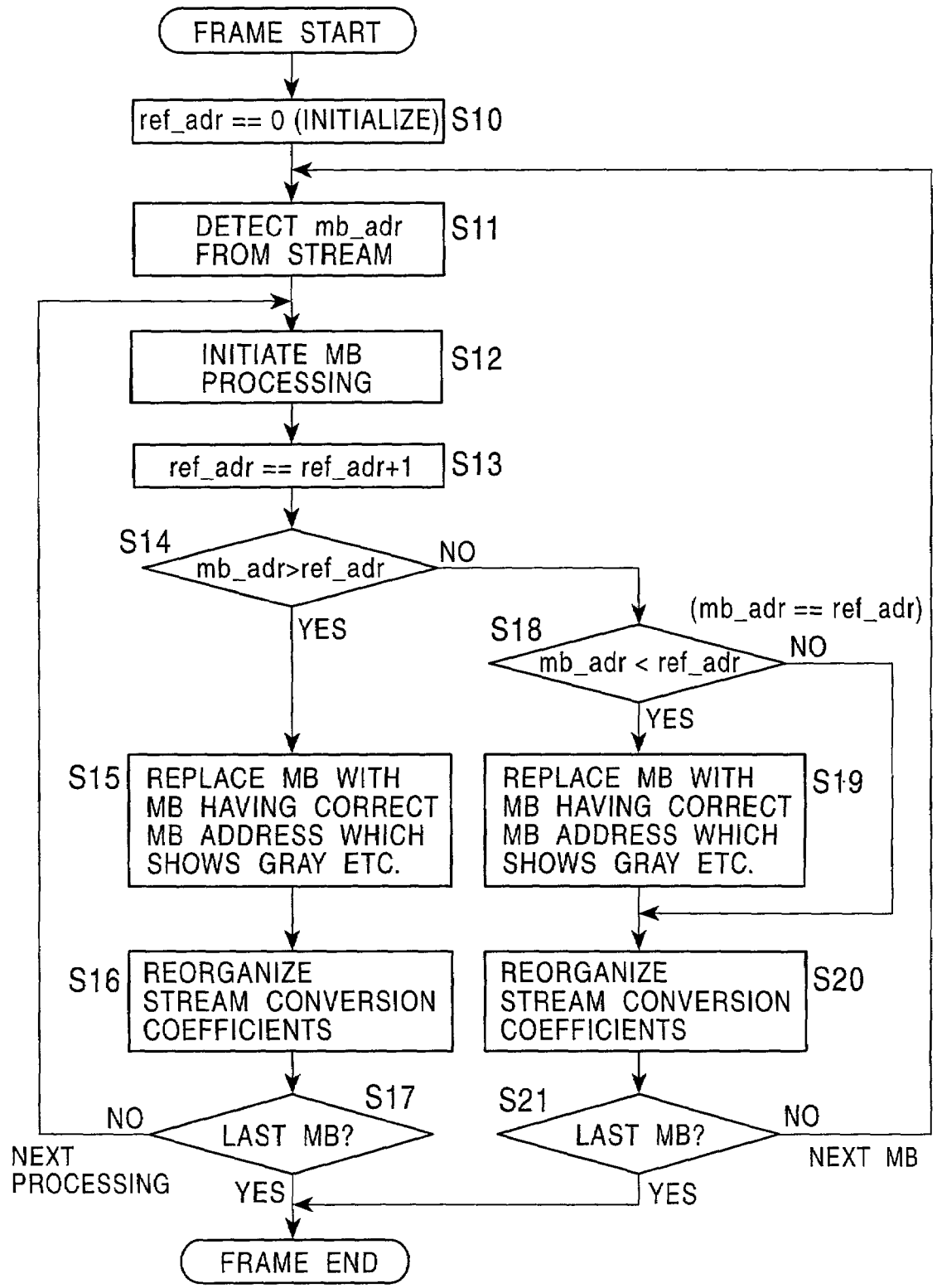
FIG. 31 is a flowchart of the process to replace a missing macroblock in the recording MFC.
Figure 32B:
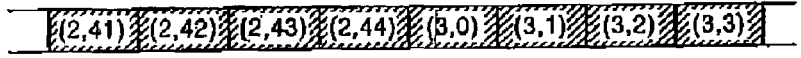
Figure 32C:
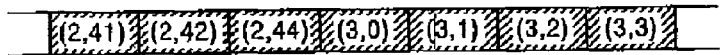

FIG. 31 is a flowchart of the process of replacing the missing macroblock in the recording MFC 106. First, in response to the frame pulse, the beginning of a frame is detected by the timing generator 302. When the frame starts, at step S10, the reference MB address "ref_address" (abbreviated as "ref_adr" in FIG. 31) is set to 0 by the timing generator 302, and the reference MB address "ref_address" is initialized. At step S11, the MB address "macroblock_address" (abbreviated as "mb_adr" in FIG. 31) is detected from the input MPEG stream by the VLD 303. The detected MB address "macroblock_address" is supplied to the address comparator 304.

When the MB address "macroblock_address" is detected and supplied to the address comparator 304 at step S11, the process proceeds to step S12 where the macroblock processing starts. First, at step S13, a new reference MB address "ref_address" calculated by adding one to the reference MB address "ref_address" is set.

At step S14, the MB address "macroblock_address" detected at step S11 is compared with the reference MB address "ref_address" calculated at step S13 by the address comparator 304. As a result of the comparison, if the MB address "macroblock_address" is greater than the reference MB address "ref_address," then it is determined that a macroblock before the macroblock in which the MB address "macroblock_address" was detected at step S11 is missing. Then, the process proceeds to step S15.

At step S15, the macroblock processing is temporarily stopped, and the missing macroblock is replaced with a macroblock having a correct MB address "macroblock_address," which displays gray etc. In other words, the "wait" signal supplied to the VLD 303 from the address comparator 304 goes high for a period of one macroblock, thereby temporarily stopping the processing in the VLD 303. In addition, the timing signal "replace_timings" output from the address comparator 304 allows the selector 306 to be switched to the second input terminal, where the output of the VLD 303 is replaced with the replacement macroblock data output from the replacement data generating circuit 305.

The stream output from the selector 306 is written to the memory 307, and the data are reordered since the read address is controlled by the VLD 308, resulting in a converted stream (step S16). At step S17, it is determined whether or not the processing which started at step S12 has reached the last macroblock in one frame. If it is determined that the last macroblock has been processed, the series of processes in the flowchart shown in FIG. 31 ends.

On the other hand, if it is determined at step S17 that the last macroblock in one frame has not been processed, the process returns to step S12. Then, the new reference MB address "ref_address" obtained at step S13 increments again by one, and the resulting value is used as another new reference MB address "ref_address," which is used for comparison at step S14. That is, in comparison with the MB address at step S14, the series of processes at step S12, S13, and S14 to S17 is repeated until a match is found between the MB address "macroblock_address" detected at step S11 and the new reference MB address "ref_address" obtained at step S13.

As a result of the comparison with the MB address by the address comparator 304 at step S14, if the MB address "macroblock_address" is greater than the reference MB address "ref_address," the process proceeds to step S18. At step S18, the MB address "macroblock_address" is further compared with the new reference MB address "ref_address" obtained at step S13 by the address comparator 104. As a result of the comparison, if the MB address "macroblock_address" is smaller than the reference MB address "ref_address," it is determined that the MB address "macroblock_address" in that macroblock in the input stream is exchanged. Then, the process proceeds to step S19.

At step S19, the input stream is pulled out by the VLD 303 at the highest rate until the next slice is found, and the missing macroblock is replaced with a macroblock which has a correct MB address "macroblock_address" and which displays gray etc. That is, as described above, according to the "next_macroblock_address" signal supplied to the VLD 303 from the address comparator 304, the macroblock is pulled out by the VLD 303 at the highest rate from the input stream until the next slice is found. In addition, the selector 306 is switched to the second input terminal according to the timing signal "replace_timings" output from the address comparator 304, where the output of the VLD 303 is replaced with the replacement macroblock data output from the replacement data generating circuit 305.

The stream output from the selector 306 is written to the memory 307, and the data are reordered since the read address is controlled by the VLD 308, resulting in a converted stream (step S20). At step S21, it is determined whether or not the processing which started at step S12 has reached the last macroblock in one frame. If it is determined that the last macroblock has been processed, the series of processes in the flowchart shown in FIG. 31 ends.

On the other hand, if it is determined at step S21 that the last macroblock in one frame has not been processed, the process returns to step S11. At step S11, the variable length code of the input stream is decoded, and the MB address "macroblock_address" is detected. Then, the process starting at step S12 is performed on the macroblock in which the MB address "macroblock_address" has been detected.

If it is determined at step S18 that the MB address "macroblock_address" is not smaller than the reference MB address "ref_address," then it is determined that a match is found between the MB address "macroblock_address" in the input stream and the reference MB address "ref_address" in connection with a result of the determination at step S14. In this case, it is determined that there is no missing or exchanged macroblock, and the process proceeds to step S20.

A modification according to this embodiment is now described. In this modification, the memory 307 is a frame memory, and the "vlc_timings" signal is a signal which induces the processing of the VLC 308 with one frame delay. The macroblocks of one frame which are output from the selector 306 are accumulated in the memory 307. This allows the macroblocks to be rearranged in the frame memory and to be successively read in the correct order as long as the processing delay for each frame permits.

According to this modification, the missing macroblock can be replaced with a macroblock having the same MB address one frame before. For example, when data is written to the memory 307, the address corresponding to the missing macroblock is not overwritten on the data but is discarded. The macroblock can be more naturally replaced than when macroblock data which displays gray as in the above-described embodiment is used.

Furthermore, if the positions of MB addresses are exchanged in the input stream, preventing the MB addresses from being arranged in the correct order, the addresses written to or the address read from the memory 307 are controlled, allowing the MB addresses to be rearranged in the correct order and to be output.

What is claimed is:

1. A data processor for processing a data stream in which a plurality of blocks into which a screen is divided are arranged in a predetermined order, said data processor comprising:
    detecting means for detecting a continuousness of said plurality of blocks based on position information of the blocks on the screen, the position information being stored in each of the blocks arranged in the data stream; and
    correcting means for correcting the continuousness of a discontinuous plurality of blocks by using position information of a previous block based on a result of the detection by said detecting means.

2. A data processor according to claim 1, wherein the data stream is a variable-length coded data stream, and block discontinuities are detected by said detecting means when the variable-length coded data stream is decoded.

3. A data processor according to claim 1, wherein said correcting means corrects block discontinuities using a block having the position information that satisfies the continuous order.

4. A data processor according to claim 1, wherein, if it is determined from a result of the detection by said detecting means that a portion of the blocks is missing, said correcting means corrects block discontinuities by temporarily interrupting the data stream for the period of the missing block portion.

5. A data processor according to claim 1, wherein, if it is determined from a result of the detection by said detecting means that one block and another of the blocks are exchanged, said correcting means finds position information of the block subsequent to an exchanged block, and, based on said position information, repeatedly corrects block discontinuities until a block having correct position information is found.

6. A data processor according to claim 1, further comprising a frame memory capable of storing at least one frame of data,
wherein at least one frame of data in the data stream is stored in the frame memory, and, if it is determined from a result of the detection by said detecting means that the position information of the blocks is discontinuous, said correcting means corrects the position information discontinuities of the blocks using the data stored in the frame memory.

7. A data processor according to claim 6, wherein, if it is determined from a result of the detection by said detecting means that a portion of the blocks is missing, said correcting means corrects block discontinuities using the data of the block one frame before which corresponds to the missing block portion, the data being stored in the frame memory.

8. A data processor according to claim 6, wherein, if it is determined from a result of the detection by said detecting means that one block and another of the blocks are exchanged, said correcting means correctly reorders the blocks by controlling addresses in the frame memory.

9. A data processing method of processing a data stream in which a plurality of blocks into which a screen is divided are arranged in a predetermined order, said data processing method comprising the steps of:
detecting a continuousness of said plurality of blocks based on position information of the blocks on the screen, the position information being stored in each of the blocks arranged in the data stream; and
correcting the continuousness of a discontinuous plurality of blocks by using position information of a previous block based on a result of said detecting step.

10. A data processing method according to claim 9, wherein the data stream is a variable-length coded data stream, and said detecting step comprising detecting block discontinuities when the variable-length coded data stream is decoded.

11. A data processing method according to claim 9, further comprising correcting block discontinuities using a block having the position information that satisfies the continuous order.

12. A data processing method according to claim 9, further comprising, if it is determined from a result of said detecting step that a portion of the blocks is missing, correcting block discontinuities by temporarily interrupting the data stream for the period of the missing block portion.

13. A data processing method according to claim 9, further comprising, if it is determined from a result of said detecting step that one block and another of the blocks are exchanged, finding position information of the block subsequent to an exchanged block, and, based on said position information, repeatedly correcting block discontinuities until a block having correct position information is found.

14. A data processing method according to claim 9, further comprising the step of storing at least one frame of data in the data stream, wherein, if it is determined from a result of said detecting step that the position information of the blocks is discontinuous, discontinuities of the position information of the blocks are corrected using the stored data.

15. A data processing method according to claim 14, further comprising, if it is determined from a result of said detecting step that a portion of the blocks is missing, correcting block discontinuities using the stored data of the block one frame before which corresponds to the missing block portion.

16. A data processing method according to claim 14, further comprising, if it is determined from a result of said detecting step that one block and another of the blocks are exchanged, correctly reordering the blocks by controlling addresses of the stored data.

* * * * *